United States Patent
Obeed et al.

(10) Patent No.: US 10,951,323 B2
(45) Date of Patent: *Mar. 16, 2021

(54) METHOD FOR JOINT POWER ALLOCATION IN A COMMUNICATION NETWORK

(71) Applicant: King Fahd University of Petroleum and Minerals, Dhahran (SA)

(72) Inventors: Mohanad Obeed, Dhahran (SA); Anas M. Salhab, Dhahran (SA); Salam A. Zummo, Dhahran (SA); Mohamed-Slim Alouini, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,950

(22) Filed: Feb. 26, 2020

(65) Prior Publication Data

US 2020/0295841 A1 Sep. 17, 2020

Related U.S. Application Data

(63) Continuation of application No. 16/298,393, filed on Mar. 11, 2019.

(51) Int. Cl.
*H04B 10/08* (2006.01)
*H04B 10/564* (2013.01)
(Continued)

(52) U.S. Cl.
CPC ..... *H04B 10/564* (2013.01); *H04B 10/07955* (2013.01); *H04B 10/116* (2013.01); *H04B 10/502* (2013.01); *H04B 15/005* (2013.01)

(58) Field of Classification Search
CPC ............ H04B 10/116; H04B 10/07953; H04B 10/502; H04B 10/11; H04B 10/1123;
(Continued)

(56) References Cited

U.S. PATENT DOCUMENTS 5,936,754 A * 8/1999 Ariyavisitakul ............................ H04B 10/25758
398/103
8,233,806 B2 * 7/2012 Kitaji ................. H04B 10/1149
398/118

(Continued)

FOREIGN PATENT DOCUMENTS

CN 107888287 A 4/2018

OTHER PUBLICATIONS

Li, et al. ; Users First: User-Centric Cluster Formation for Interference-Mitigation in Visible-Light Networks ; 16 Pages.

(Continued)

*Primary Examiner* — Hibret A Woldekidan
(74) *Attorney, Agent, or Firm* — Oblon, McClelland, Maier & Neustadt, L.L.P.

(57) ABSTRACT

Joint power allocation and cell formation for energy efficient (EE) visible light communication (VLC) networks is described. A set of rules for clustering users and then associating all the access points (APs) to the clustered users based on a proposed metric is developed. The energy efficiency is maximized by allocating power to users based on quality of service (QoS) constraints. The present disclosure jointly allocates the power and decides which APs must participate in communication and which ones must be switched off to minimize inter-cell interference. Numerical results demonstrate a significant improvement in energy efficiency compared to the traditional methods of clustering and AP assignment.

8 Claims, 13 Drawing Sheets

(51) Int. Cl.
*H04B 15/00* (2006.01)
*H04B 10/50* (2013.01)
*H04B 10/116* (2013.01)
*H04B 10/079* (2013.01)

(58) Field of Classification Search
CPC .... H04B 10/40; H04B 10/503; H04B 10/564; H04B 10/07955; H04B 15/005; H04B 10/1149; H04B 10/0795; H04B 10/50; H04W 4/08; H04W 16/28; H04W 72/048; H05B 37/0272; E05F 15/43
USPC .......... 398/38, 118, 120, 128, 130, 171, 172
See application file for complete search history.

(56) References Cited

U.S. PATENT DOCUMENTS

| | | | | |
|---|---|---|---|---|
| 8,295,705 | B2* | 10/2012 | Kim | H04B 10/1149 398/103 |
| 8,380,081 | B2* | 2/2013 | Kim | H04B 3/542 398/154 |
| 8,428,469 | B2* | 4/2013 | Kim | H04B 10/116 398/127 |
| 8,565,612 | B2* | 10/2013 | Kim | H04B 10/116 398/127 |
| 8,699,887 | B1* | 4/2014 | Rothenberg | H04B 10/116 315/158 |
| 9,037,001 | B2* | 5/2015 | Jovicic | H04B 10/1141 398/172 |
| 9,166,683 | B2* | 10/2015 | Jovicic | H04B 10/116 |
| 9,391,699 | B2* | 7/2016 | Jovicic | H04B 10/116 |
| 9,577,755 | B2* | 2/2017 | Jovicic | H04B 10/116 |
| 10,027,412 | B2* | 7/2018 | Eroglu | H04B 10/116 |
| 10,396,894 | B2* | 8/2019 | Haas | H04B 10/116 |
| 10,411,799 | B1* | 9/2019 | Noshad | H04B 10/1149 |
| 2011/0069957 | A1* | 3/2011 | Kim | H04B 3/542 398/75 |
| 2011/0087879 | A1* | 4/2011 | Chand | H04K 3/25 713/153 |
| 2013/0126713 | A1* | 5/2013 | Haas | H04B 10/116 250/208.2 |
| 2015/0093107 | A1* | 4/2015 | Jovicic | H04B 10/116 398/25 |
| 2016/0269113 | A1* | 9/2016 | Jovicic | H04B 10/116 |
| 2017/0207851 | A1* | 7/2017 | Zeng | H04L 12/46 |
| 2017/0346559 | A1* | 11/2017 | Eroglu | H04B 10/116 |
| 2019/0132050 | A1* | 5/2019 | Salhab | H04B 10/116 |
| 2019/0141712 | A1* | 5/2019 | Liu | H04W 52/52 |
| 2019/0296825 | A1* | 9/2019 | Chen | H04L 5/001 |
| 2019/0349089 | A1* | 11/2019 | Brandt-Pearce | H04B 10/564 |

OTHER PUBLICATIONS

Zhang, et al. ; Interference Management and Power Allocation for NOMA Visible Light Communications Network ; IEEE Communication Letters ; Jul. 26, 2016 ; 5 Pages.

Chen, et al. ; Joint Transmission in Indoor Visible Light Communication Downlink Cellular Networks ; Globecon 2013 Workshop—Optical Wireless Communications ; pp. 1127-1132 ; 6 Pages.

Kanungo, et al. ; An Efficient k-Means Clustering Algorithm: Analysis and Implementation ; IEEE Transactions on Pattern Analysis and Machine Intelligence, vol. 24, No. 7 ; Jul. 2002 ; 12 Pages.

Obeed, et al. ; New Algorithms for Energy-Efficient VLC Networks with User-Centric Cell Formation ; 32 Pages.

Zhang, et al. ; Energy Efficient Visible Light Communications Relying on Amorphous Cells ; IEEE Journal on Selected Areas in Communications vol. 24, No. 4 ; Apr. 2016 ; 13 Pages.

Li, et al. ; User-Centric Visible Light Communications for Energy-Efficient Scalable Video Streaming ; IEEE Transactions on Green Communications and Networking vol. 1, No. 1 ; Mar. 2017 ; 15 Pages.

Zhang,, et al, ; Visible Light Communications in Heterogeneous Networks: Paving the Way for User-Centric Design ; IEEE Wireless Communications ; Apr. 2015 ; 9 pages.

Paudel, et al. ; Lambertian Source Modelling of Free Space Optical Ground-to-Train Communications ; 5 Pages.

Saju, et al. ; Comparison of ACO-OFDM and DCO-OFDM in IM/DD Systems ; International Journal of Engineering Research & Technology, vol. 4, Issue 4 ; Apr. 2015 ; 5 Pages.

Arthur, et al. ; k-means++: The Advantages of Careful Seeding ; 11 Pages.

Aftab, et al. ; Potentials and Challenges of Light Fidelity Based Indoor Communication System ; International Journal of New Computer Architectures and Their Applications ; pp. 92-102 ; The Society of Digital Information and Wireless Communications ; 2016; 11 pages.

\* cited by examiner

METHOD FOR JOINT POWER ALLOCATION IN A COMMUNICATION NETWORK

CROSS-REFERENCE TO RELATED APPLICATIONS

The present application is a Continuation of Ser. No. 16/298,393, now allowed, having a filing date of Mar. 11, 2019.

BACKGROUND OF THE INVENTION

Technical Field

The present disclosure is directed to a system, method and non-transitory computer readable medium having instructions stored therein for joint power allocation and cell formation for energy efficient (EE) visible light communication (VLC) networks. Users may be clustered and access points may be associated with each cluster in order to maximize the energy efficiency of each cluster, maximize the global energy efficiency of the network and/or minimize the inter-cell interference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Radio frequency (RF) communications are restricted due to the limited spectrum resources in wireless networks. Using the visible light frequency spectrum instead of the RF frequency provides a sustainable alternative to achieve high-speed wireless connectivity.

Visible light communication (VLC) is the term given to an optical wireless communication system that conveys information by modulating light that is visible to the human eye. Communication is achieved by switching LED lights on and off at a speed higher than what is perceptible to the human eye. Eyes can detect changes in light brightness and power, but they cannot perceive light that is switched on and off rapidly. A photodiode, on the other hand, can easily recognize the rapid on-off modulation. A photodiode is a photodetector that produces an electrical current that is proportional to the optical power that is incident on the photodetector surface. This simple principle makes possible visible-light communication technology that supports both illumination and wireless communication using an LED. Unlike RF wireless communication, where specialized tools are needed to find a service area, the presence of a VLC service area will be easily detected. The visible spectrum is the portion of the electromagnetic spectrum having wavelengths from about 380 nm to 780 nm and in terms of frequency corresponds to a band of 385-789 THz.

Because of its capability to perform the dual function of lighting as well as high speed communication, light fidelity (Li-Fi) offers performance enhancements which can make it an attractive backup option to be used as a network within the Internet of things (IOT) technologies and its indoor capabilities make it a desirable choice for large scale indoor communication in a next generation wireless networking environment. As a result, visible light communication, VLC, has been introduced to indoor environments to overcome the RF limitations and provide better services to the users in a Li-Fi network.

VLC is a communications system that uses light emitting diodes (LED), which are highly energy efficient, as transmitters to emit both light and information signals to the users. The power range of the information signal must be such that the illumination requirement is satisfied while staying within the physical transmission limits of an LED. The receiver must be equipped with a photodetector (PD) device that converts the optical signal to an electrical signal. Hence, data is transmitted using an intensity modulation (IM) technique at the transmitter and received using a direct detection (DD) technique at the receiver (IM/DD). Unlike RF networks, the VLC works properly only when there is a line of site (LoS) component between the transmitter and receiver available.

Extensive work has been done to achieve throughput and system capacity maximization in VLC networks using different modulation schemes, resource allocation and load balancing, and using multi-input multi-output schemes. (See A. Yesilkaya, E. Basar, F. Miramirkhani, E. Panayirci, M. Uysal, and H. Haas, "Optical MIMO-OFDM with generalized LED index modulation," *IEEE Trans. Commun.*, vol. 65, no. 8, pp. 2429-3441, 2017; J. Armstrong, "OFDM for optical communications," *IEEE/OSA J. Lightw. Technol.*, vol. 27, no. 3, pp. 189-204, 2009; X. Li, R. Zhang, and L. Hanzo, "Cooperative load balancing in hybrid visible light communications and WiFi," *IEEE Trans. Commun.*, vol. 63, no. 4, pp. 1319-1329, 2015; Y. Wang, D. A. Basnayaka, and H. Haas, "Dynamic load balancing for hybrid Li-Fi and RF indoor networks," in *Proc. IEEE Int. Conf. Commun. Workshops* (ICCW), London, U K, 2015, pp. 1422-1427; and A. Nuwanpriya, S.-W. Ho, and C. S. Chen, "Indoor MIMO visible light communications: Novel angle diversity receivers for mobile users," *IEEE J. Sel. Areas Commun.*, vol. 33, no. 9, pp. 1780-1792, 2015, each incorporated herein by reference in their entirety).

Despite the aforementioned advances, knowledge of the design and optimization issues of energy efficiency (EE) in VLC networks has been limited. However, with the advent of 5G wireless networks and the tremendous number of access points (APs) and billions of connected devices, the demand for more energy efficient systems has grown. (See S. Buzzi, I Chih-Lin, T. E. Klein, H. V. Poor, C. Yang, and A. Zappone, "A survey of energy-efficient techniques for 5G networks and challenges ahead," *IEEE J. Sel. Areas Commun.*, vol. 34, no. 4, pp. 697-709, 2016, incorporated herein by reference in its entirety).

To increase the energy efficiency in VLC networks, several factors have been researched, such as cell formation, power allocation, and link level optimization. Because inter-cell interference is a major cause of QoS and energy efficiency degradation, cell formation has been proposed to mitigate this problem by grouping multiple access points, APs, in one cell. Cell formation design is a crucial step that has a great impact on the energy efficiency of the system. In highly dense VLC networks, when the number of users is much less than the number of APs, a user-centric (UC) design for VLC networks is an appropriate technique for cell formation. A user-centric (UC) design for VLC, where the resultant user-to-network association structure is based on amorphous cell-shapes has been studied, where users were first clustered then APs were assigned to the user clusters. (See R. Zhang, J. Wang, Z. Wang, Z. Xu, C. Zhao, and L. Hanzo, "Visible light communications in heterogeneous networks: Paving the way for user-centric design," *IEEE*

*Wireless Commun.*, vol. 22, no. 2, pp. 8-16, 2015, incorporated herein by reference in its entirety). Fairness of clustering among users has been studied. (See X. Li, F. Jin, R. Zhang, J. Wang, Z. Xu, and L. Hanzo, "Users first: User-centric cluster formation for interference-mitigation in visible-light networks," *IEEE Trans. Wireless Commun.*, vol. 15, no. 1, pp. 39-53, 2016, incorporated herein by reference in its entirety). Further, work has been done to allocate power for the clustered users aiming to maximize the energy efficiency of the distributed cells. (See R. Zhang, H. Claussen, H. Haas, and L. Hanzo, "Energy efficient visible light communications relying on amorphous cells," *IEEE J. Sel. Areas Commun.*, vol. 34, no. 4, pp. 894-906, 2016, incorporated herein by reference in its entirety). Previous attempts have been made to optimize energy efficient VLC systems by solving the cell formation and power allocation separately, however these are interlinked problems. (See X. Li (2016); R. Zhang (2016); and X. Li, Y. Huo, R. Zhang, and L. Hanzo, "User-centric visible light communications for energy-efficient scalable video streaming," *IEEE Trans. Green Commun. Netw.*, vol. 1, no. 1, pp. 59-73, 2017, each incorporated herein by reference in their entirety).

Finding a global solution for joint cell formation and power allocation is an extremely difficult problem. A solution is presented in the present disclosure by considering the AP association and power allocation problems jointly.

In the present disclosure, a solution for an energy efficient VLC network is described including efficient algorithms that jointly form cells, allocate power to the users, and select the APs. A user clustering algorithm is presented that aims to minimize the distance of the clustered users to their centers and maximize the distance between the different centers in order to mitigate the inter-cell interference. A metric for each AP is established in order to select the appropriate user cluster to manage.

The present disclosure shows that the power allocation and cell formation problems are not separate problems as shown in the previous efforts. Numerical results demonstrate that there exists a number of clusters which achieve the highest energy efficiency under a given user clustering and AP association. The system and methods of the present disclosure solve both problems jointly, which leads to a significant improvement in the energy efficiency over previous solutions.

SUMMARY

In an exemplary embodiment, a system for joint power allocation and cell formation for energy efficient (EE) visible light communication (VLC) networks includes a plurality of VLC access points, each access point including a plurality of light-emitting diodes (LEDs). The access points are intensity modulated to transmit a light signal over a line-of-sight channel to a user device in a cluster of user devices, which includes at least one photodetector for receiving the light signal. The system is operated by a control system, which includes at least a controller, a memory, a database, a processor and processing modules for performing the joint power allocation and cell formation.

The user devices are clustered in groups, where each user in a group is centered about a central point. K-means++ is used to determine the clusters and a constraint is added to the K-means++ that the average distance between the users in the different clusters is maximized.

Each cluster is associated with at least one AP of the plurality of APs. An AP association module associates the APs with the clusters until all the APs are assigned.

The signal energy transmitted to each cluster is maximized. The global energy efficiency by minimizing inter-cell interference. The inter-cell interference is minimized by a procedure which adjusts the ON/OFF status of each interfering AP in turn, calculates the global energy efficiency of the system and continues to adjust the APs until the difference between the current global energy efficiency, and the previous global energy efficiency equals zero.

In another exemplary embodiment, a method for joint power allocation and cell formation for energy efficient (EE) visible light communication (VLC) networks includes grouping, by a control system, a plurality of users into user centric clusters based on their distance to each other; forming, by the control system, cells of a plurality of access points, AP, by associating an access point to each user centric cluster, wherein associating is based on maximizing cell capacity within each cell and minimizing inter-cell interference from other cells; allocating power, by the control system, to the APs associated with each user cluster to maximize the energy efficiency (EE) of each user centric cluster; calculating, by the control system an inter-cell interference, an energy efficiency of each cluster and a global energy efficiency of the visible light communication (VLC) network; and adjusting, by the control system, the operational status of each one of the plurality of APs based on the inter-cell interference and the global energy efficiency.

In another exemplary embodiment, a non-transitory computer readable medium having instructions stored therein that, when executed by one or more processor, cause the one or more processors to perform a method for joint power allocation and cell formation for energy efficient (EE) visible light communication (VLC) networks. The computer readable medium method includes grouping, by a control system including at least a controller, a memory, a database, and the one or more processors, a plurality of users into user centric clusters based on their distance to each other; forming, by the control system, cells of a plurality of access points, AP, by associating an access point to each user centric cluster, wherein associating is based on maximizing cell capacity within each cell and minimizing inter-cell interference from other cells; allocating power, by the control system, to the APs associated with each user cluster to maximize the energy efficiency (EE) of each user centric cluster; calculating, by the control system an inter-cell interference, an energy efficiency of each cluster and a global energy efficiency of the visible light communication (VLC) network adjusting, by the control system, the operational status of each of the plurality of APs based on the inter-cell interference and the global energy efficiency.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
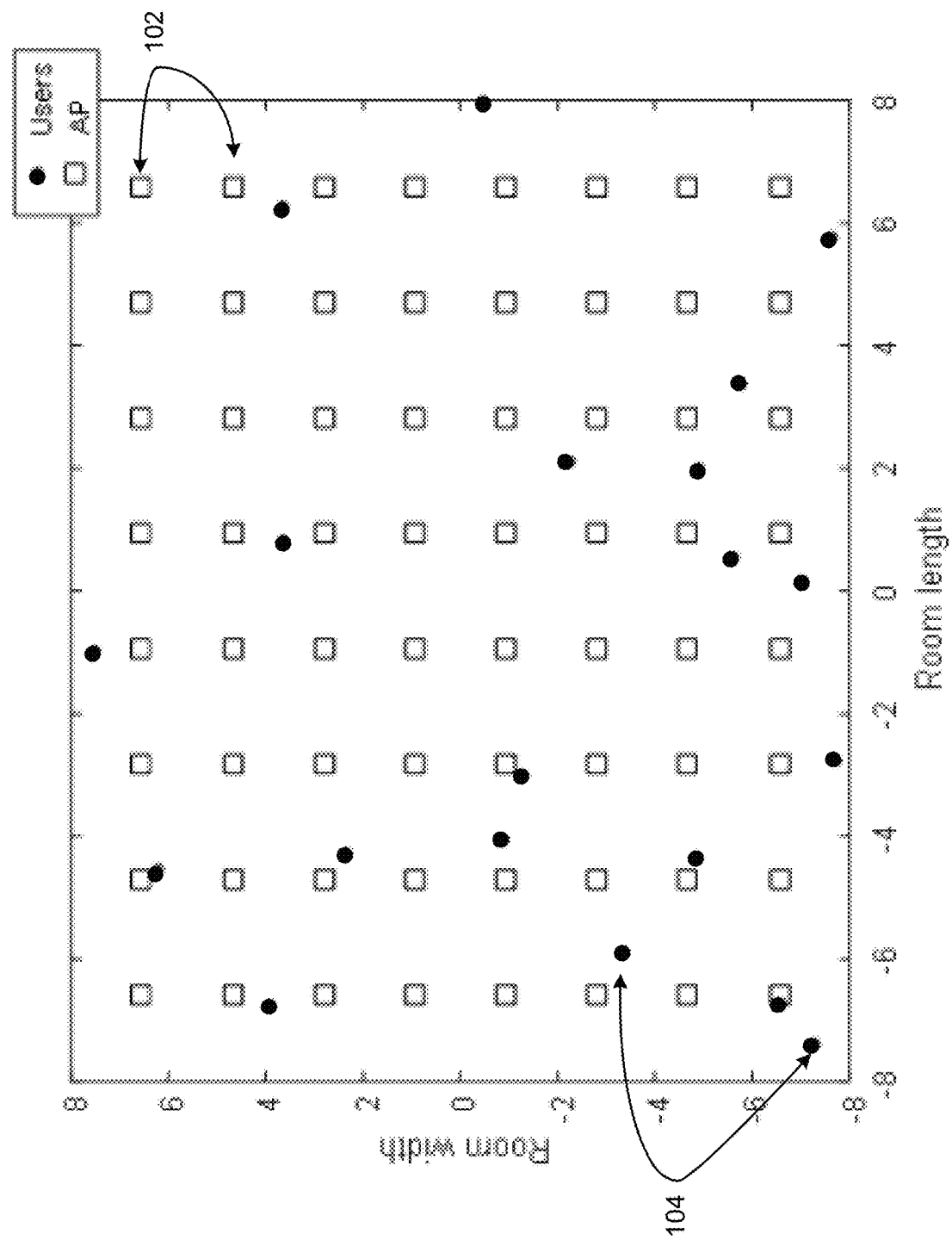
FIG. 1A illustrates a VLC system showing AP locations and user locations, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, method and non-transitory computer readable medium having instructions stored therein for joint power allocation and cell formation for energy efficient (EE) visible light communication (VLC) networks.

LED's are currently used in optical communication systems. Due to their extremely low cost and because LED's emit light from a sufficiently large surface area they are generally considered eye-safe. Further, LEDs have a long lifespan, are energy efficient and generate only low levels of heat.

Typical packaged LED's emit light into semi-angles (at half power) ranging from about 10-30 degrees making them suitable for directed transmitters. Non-directed transmitters frequently employ multiple LED's oriented in different directions.

In an aspect of the present disclosure, the system under consideration consists of a number, $N_A$, of visible light communication (VLC) access points (APs) and a number, $N_u$, of users having photodetector receivers, as shown in FIG. 1A. The users 104 are distributed uniformly in the room and the APs 102 are fixed in the ceiling of the room or on some other substrate or structure in the room. Each AP is equipped with multiple LEDs which use intensity modulation to transmit the light signal to the users, which receive the light by means of a photodetector. The locations of users are assumed to be unchanged during the short transmission/reception time duration, T, under consideration. Thus, the channel-state-information (CSI) of the VLC links is considered to be constant during this period. The number of users is assumed to be much less than the number of APs.

The line-of-sight (LoS) VLC channel between an $i^{th}$ LED and a $j^{th}$ user (photodetector) separated by a distance $d_{i,j}$ (see FIG. 1B, 1C) can be expressed as follows $$h_{i,j}^{(v)} = \frac{(m+1)A_p}{2\pi d_{i,j}^2}\cos^m(\phi)g_{of}f(\theta)\cos(\theta), \quad (1)$$

where m is the Lambertian index that is given by $m=-1/\log_2(\cos(\theta_{1/2}))$, where $\theta_{1/2}$ is the half intensity radiation angle, $A_p$ is the physical area of the photodetector, $d_{i,j}$ is the distance between the $i^{th}$ LED to the $j^{th}$ user, $g_{of}$ is the gain of the optical filter, $\phi$ is the angle of irradiance at the LED, $\theta$ is the angle of incidence as seen at the photodetector, and $f(\theta)$ is the optical concentrator gain of the photodetector, which is a function of $\theta$ that is given by $$f(\theta) = \frac{n^2}{\sin^2(\Theta)} \text{ if } \theta \leq \Theta \text{ or } 0 \text{ if } \theta > \Theta,$$

where n is the refractive index and $\Theta$ is the semi-angle of the field-of-view (FOV) of the photodetector. (See J. M. Kahn and J. R. Barry, "Wireless infrared communications," *Proc. IEEE*, vol. 85, no. 2, pp. 265-298, 1997; R. Paudel; Z. Ghassemlooy; H. Le Minh; S. Rajbhandari; E. Leitgeb, "Lambertian source modelling of free space optical ground-to-train communications", Optical Communications Research Group, NCRLab, School of Computing, Engineering and Information Sciences, Northumbria University, Newcastle upon Tyne, United Kingdom, 2012, 8th International Symposium on Communication Systems, Networks & Digital Signal Processing (CSNDSP); and Aftab, F., "Potentials and Challenges of Light Fidelity Based Indoor Communication System", International Journal of New Computer Architectures and their Applications (IJNCAA) 6(3): 92-102 The Society of Digital Information and Wireless Communications, 2016 ISSN 2220-9085 (Online); ISSN 2412-3587, each incorporated herein by reference in its entirety).

In the above equation (1), $h_{i,j}^{(v)}$ is the line-of-sight channel between the $i^{th}$ LED and the $j^{th}$ user (photodetector) which are separated by a distance $d_{i,j}$. The term (v) to indicates that the link is visible light, so $h_{i,j}^{(v)}$ can be simplified to $h_{i,j}$ for calculations limited to visible light.

Figure 1B:
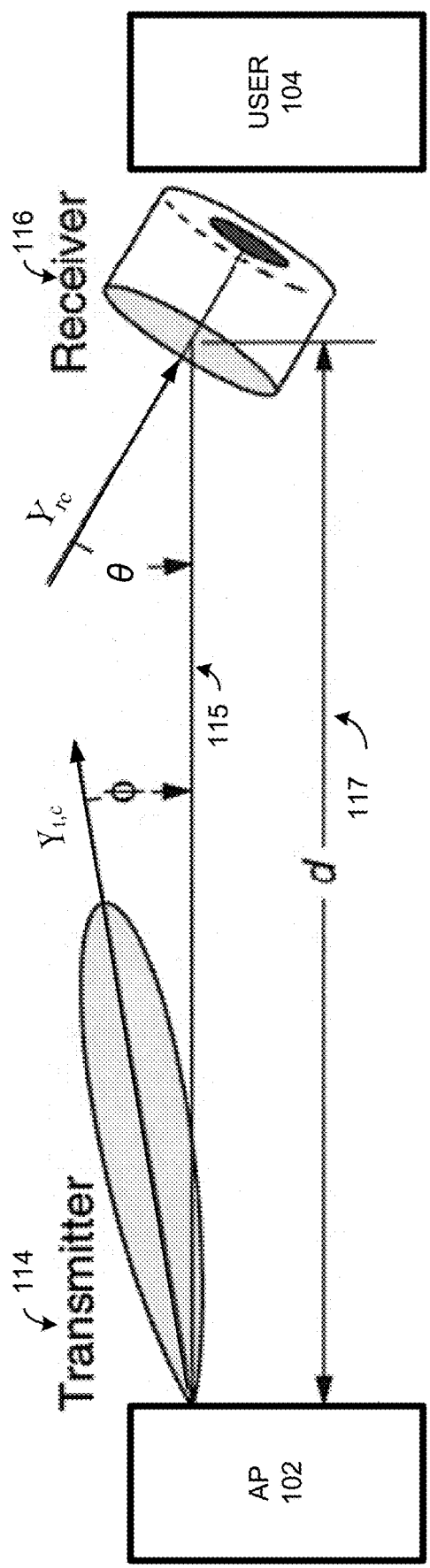
FIG. 1B illustrates a VLC system showing the relationship between AP transmission angle and photodetector reception angle, according to certain embodiments.

In a non-limiting example, some design and operating parameters of the VLC system shown in FIGS. 1A and 1B are shown in Table 1 below. These design and operating parameters are stored in database 664 of FIG. 6, and are accessed by the controller and processor to perform the calculations of the present disclosure.

As shown in FIG. 1B, Each AP 102 includes a transmitter 114 comprising an array of LEDs whose radiation angle is shown as φ. Each user 104 has a receiver 116 which includes a photodetector array whose reception angle is shown as θ.

Figure 1C:
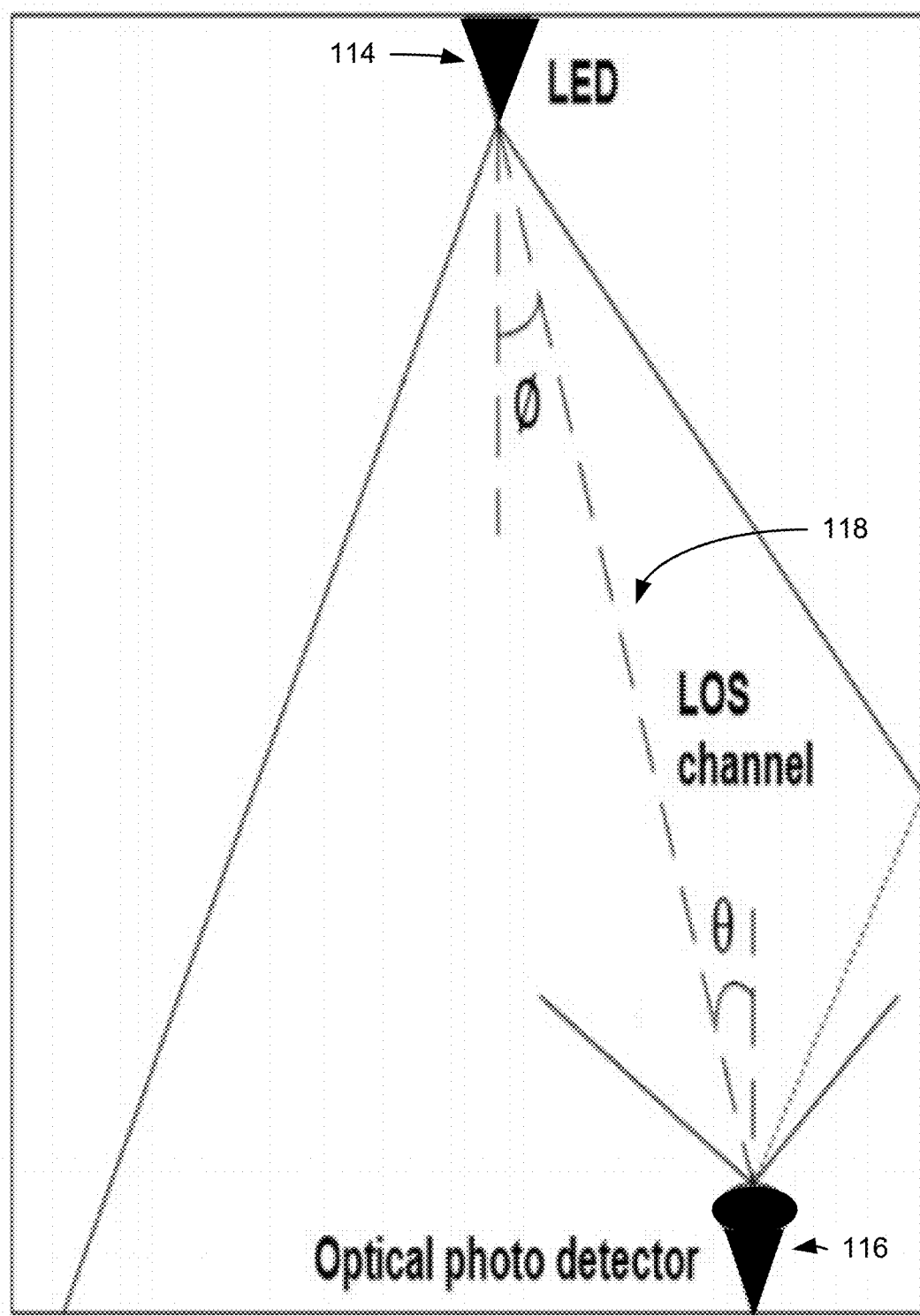
FIG. 1C illustrates a communication channel between an AP and a receiving photodetector of a user, according to certain embodiments.

In a VLC network, the LED has to operate in the linear region so that the optical power at its output is a linear function of the input voltage. Non-line-of-sight (LoS) VLC transmissions are assumed to be unsuccessful so that only LoS paths are considered. This assumption does not affect equation (1) since it does not depend on a specific channel model. Therefore, when a line of sight, LoS, path is available, $h_{i,j}^{(v)}$ is given by (1); otherwise, $h_{i,j}^{(v)}=0$. The LoS communication channel is shown in FIG. 1C.

In aspects of the present disclosure, there are a plurality of users, as indicated by user 104 of FIG. 1A. These users are clustered in groups. Each user cluster is centered about a center point so that the distance of each user in the cluster from the center point follows the constraints of a clustering algorithm. Further, each cluster group is chosen so that the distance between the cluster groups is maximized, subject to a constraint.

A user-centric (UC) clustering algorithm is developed for a given number of clusters, then provides an algorithm for the association of access points, APs, to the formed user clusters. The target in user clustering is to maximize the separation between the clusters or in other words, maximize the distances between the edge users who belong to different cells.

The clustering approach of the present disclosure describes a new method for choosing the cluster centers, which has a significant impact on the final results.

1) User-centric clustering: In a first aspect, the present disclosure aims to group the users in predefined K clusters to maximize the energy efficiency (EE) of the whole network. Clustering the users based on their geographical positions, to have the summation of the distances of all users in a cluster to their centers as small as possible, enhances the EE of the system.

In one aspect, the users are grouped in predefined K clusters based on their distances to each other. A first target is to have distances between the cluster centers as far apart as possible, and a second target is to have the summation of the distances of all users in a cluster to their center as small as possible. The first target contributes in decreasing the inter-cell interference, while the second target contributes in enhancing the energy efficiency inside the cells when the inter-cell interference is ignored.

Traditional K-means clustering has been used to cluster users based on their distances to each other. K-means clustering is designed to minimize the following objective function $$U = \sum_{k \in K} \sum_{j \in c} \|x_{j,k} - c_k\|^2, \quad (2)$$

where $x_{j,k}$ is the position of the user j in the cluster k, where $c_k$ is the center (also called the centroid) of the cluster k. There are many versions of K-means in literature. An improvement in K-means clustering method was proposed by D. Arthur et al. (2007), called K-means++. In K-means++, the cluster centers are randomly chosen as in traditional K-means clustering, but the data points are weighted according to their squared distance from the closest center already chosen. Briefly, the K-means++ augmented traditional K-means with a randomized seeding technique which helps in improving the speed and the accuracy. (See D. Arthur and S. Vassilvitskii, "K-means++: The advantages of careful seeding," in *Proc. The 8th Annual ACM-SIAM Sympo. Discrete Algorithms*. Society for Industrial and Applied Mathematics, 2007, pp. 1027-1035, incorporated herein by reference in its entirety). The main disadvantage with the K-means++ method of Arthur, D. is that the selection of the initial centers may lead to a poor clustering since it is based on a probabilistic selection, and is not built for the special structure of the VLC networks which are highly affected by intercell interference.

Therefore, the present disclosure utilizes a robust selection scheme for the initial centers that outperforms the K-means++ in terms of maximizing and improving energy efficiency by providing an improved method for selecting the initial centers.

In addition to the objective of the K-means++ algorithm, another objective is used that helps by decreasing the inter-cell interference. This objective is to maximize the average distance between the users in the different clusters. This means having the distances between the cluster centers as large as possible.

To formulate this objective, note that if there are K clusters and the distances between them are $d_{i,j}$, i=1, ..., K, j=i+1, ..., K, if the summation of distances between all points is constrained to equal D, the solution of the following equation:

$$\max_{d_{i,j}} \prod_{i=1, j=i+1}^{K} d_{i,j}, \text{ such that } \sum_{k=1, j=i+1}^{K} d_{i,j} \leq D, \quad (3)$$

is $$d_{i,j} = \frac{D}{K},$$

where i=1, ..., K, j=i+1, ..., K, and Π is the product operator. This means that if there are MK centers, the maximum separable K centers out of MK can be found by finding the product, Π, of the distances of all possible K centers and determining the maximum distance, where M is an integer value greater than or equal to 1. Maximum separability means each cluster K is at the maximum distance from the other clusters.

Figure 1D:
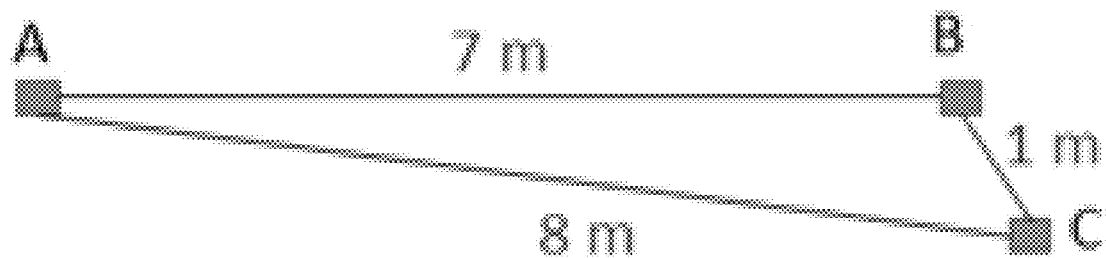
FIG. 1D illustrates maximum separability of three K centers, for specified centers.
Figure 1E:
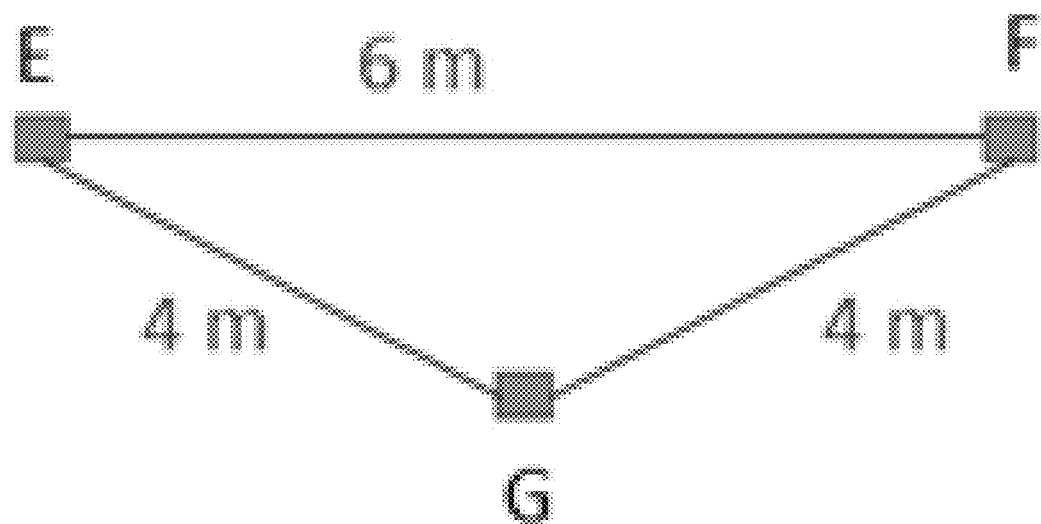
FIG. 1E illustrates maximum separability of three K centers, for largely spaced specified centers.

In a non-limiting example describing separability, if K=3 (i.e. three clusters) and M=2, meaning there are 2 K centers per cluster, then 6 centers (K*M=3*2) are generated by following the K-means++ principle. For each three centers out of 6, the multiplication of the distances between centers is found for each set of three centers. For example, as shown in FIGS. 1D and 1E, K=3 and M=2. Despite that the summation of the distances in FIG. 1D (7+1+8=16) is greater than the summation of the distances in FIG. 1E (6+4+4=14), it is obvious that the centers given in FIG. 1D are worse because the centers B and C are much close to each other and the mutual interference between them would be high. Therefore, the best 3 centers are found by calculating $T_1=7*1*8=56$ and $T_2=6*4*4=96$, and then because $T_2>T_1$, the best 3 centers are the given by FIG. 1E which are points EFG.

Increasing M allows selection of the centers that have maximum distances, but also increases the complexity. The integer number M is selected based on the required application. If performance is more important than the complexity, it would be better to have a high value of M; if the complexity is more important than performance, the value of M should be decreased. In other words, increasing M enhances the performance and increases the complexity, and decreasing M decreases the complexity but degrades the performance. "MK-centers" can be written as "MK-means" or "M*K-means".

In an example which starts with a number of initial centers that is much larger than K, the centers that are maximum separable are selected using equation (3). Therefore, the following clustering algorithm is described:

Algorithm 1—User Clustering Algorithm

1) Randomly select a user $c_i$ to be the first center $c_l$.

2) For each user $c_i$, find the shortest distance $D(x)$ from the user $c_i$ to the closest $c_l$.

3) Select a new center, $c_k$, selecting x∈X with probability $$\frac{D(x)^2}{\sum_{x \in X} D(x)^2}$$

until there are K centers.

4) For each k∈1, . . . , K, set the cluster $C_k$ to be the set of points in X that are closer to $c_k$ than they are to $c_j$ for all k≠j, and then update the centers.

5) Calculate $$T_m = \prod_{i=1, j=i+1}^{K} d_{i,j},$$

where $d_{i,j}$ is the distance between center i and center j.

6) Repeat (3)-(5) M times and select the K centers which give the maximum $T_m$.

7) Update the centers until $|c_{k-1} - c_k| \le \in$, where $c_{k-1}$ is the previous center, $c_k$ is the current center, and ∈<<1 is a very small value such as 0.001.

Increasing M would have the effect of enhancing the performance while increasing the complexity, and decreasing M would have the effect of decreasing the complexity while degrading the performance. The complexity of Algorithm 1 is at most M times the complexity of the K-means++ algorithm, but has a large impact on the energy efficiency EE, however, this complexity is negligible compared with the complexity of the power allocation problem.

2) AP Association:

Increasing the number of APs in a cluster enhances the energy efficiency of that cluster, but also increases the inter-cell interference in the other clusters.

A second aspect of the present disclosure describes a new cluster formation technique that first involves all the APs in the network, then switches off the ones that are harmful (in terms of increasing the inter-cell interference) more than helpful (in terms of enhancing the energy efficiency inside the cell). Here, the APs are distributed to the clustered users, and the selection of APs is improved based on a given power allocation as described below. The goal is that, for each AP, the best user cluster of users is selected to serve the associated users and to enhance the energy efficiency as much as possible. The following two steps are used to associate the APs to the formed cells:

Step 1) Each user device is assigned to its closest AP by using the following procedures:

i) In the channel matrix, find the maximum channel value, assign the corresponding AP to the corresponding user, then make the row and the column of the corresponding pair equal to zero, ii) Repeat i) until the channel matrix equals the zero matrix.

Step 2) Referring back to Step (1), for the remaining APs, for each cluster c, find the average channel value $\hat{d}_{i,c}$, of all APs to all users in the cluster c as follows $$\hat{d}_{i,c} = \sum_{j \in c} h_{j,i}^2, \quad (4)$$

$$c = 1, \ldots, K, i = 1, \ldots, N_A.$$

Next, associate the AP i to the cluster that satisfies this relationship:

$$I_i = \max_c (\hat{d}_{i,c}), c = 1, \ldots, K.$$

where $I_i$ represents the AP i or the AP index, which indicates to which cluster the AP i should be associated. For example, $I_2=5$ means that the AP 2 should be associated to the cluster 5.

The target of the second step is to associate the AP to the cluster that would maximize the cell capacity and minimize the inter-cell interference in the other cells.

In order to maximize the energy efficiency EE and minimize the inter-cell interference, the objective is to allocate power for all users by selecting the APs that help in enhancing the EE. After forming the cells, the power allocation problem is solved, after which an algorithm is used that jointly solves the power allocation problem and APs selection.

In each cell, there are $N_{A,c}$ APs transmitting a signal vector $Y_{i,c} \in \mathbb{R}^{N_{A,c} \times 1}$ to $N_{u,c}$ users, and the received signal vector is given by $$Y_{r,c} = \rho H_c G_c \bar{P}_c Y_{t,c} + n_c, \quad (5)$$

where $H_c \in \mathbb{R}^{N_{u,c} \times N_{A,c}}$ is the channel attenuation matrix, $\bar{P}_c = \text{diag}(P_c)$, where $P_c$ is the electronic power vector assigned to the users belong to the cluster c, $n_c$ is the noise plus the inter-cell interference, and $G_c$ is the pre-coding matrix that is designed to diagonalize the channel matrix by equating it by $G_c = H_c^H (H_c H_c^H)^{-1}$. $\mathbb{R}^{N_{A,c} \times 1}$ is a matrix consisting of real numbers where the number of rows is $N_{A,c}$ and the number of columns is 1. The channel attenuation matrix is the matrix that contains the values that attenuate the signals transmitted from the APs to the users. In a non-limiting example, if the $2^{nd}$ row and the $3^{rd}$ column of the channel matrix is 0.0002, then the transmitted signal from the $3^{rd}$ AP to the $2^{nd}$ user will be attenuated by 0.0002. The electronic power vector refers to the power given to transmit a vector of messages. This vector may represent a packet, a string of bits, a ping, or any other single transmission from an AP. The pre-coding matrix is also called the diagonalizing channel matrix: It is the matrix that is multiplied by the transmitted vector to diagonalize the channel and eliminate the inter-cell interference. In equation (5), the power is known and can be controlled or modified, while the noise is not completely known. The statistical information of the noise is known, while the instantaneous value of the noise is unknown.

In a non-limiting example, the operating parameters of an exemplary AP may be found in Table I below.

TABLE I

Simulation Parameters

| Name of the Parameter | Value of the Parameter |
|---|---|
| Room height | 3 m |
| Maximum bandwidth of VLC AP, B | 20 MHz |
| The physical area of a PD, $A_p$ | 0.1 cm$^2$ |
| Half-intensity radiation angle, $\theta_{1/2}$ | 60° |
| Half FoV (H-FoV) semi-angle of PD,$\Theta$ | 45°-55° |
| Gain of optical filter, $g_{of}$ | 1 |
| Refractive index, n | 1.5 |
| Efficiency of converting optical to electric, $\rho$ | 0.53 [A/W] |
| Maximum transmit power, $p_{max}$ | 0.386 Watt |
| Noise power spectral density of LiFi, $N_0$ | $10^{-22}$ A$^2$/Hz |

A. Power Allocation Scheme

One objective is to allocate the power for the $N_u$ users to maximize the EE. Specifically, an objective is to maximize the energy efficiency in each formed cell under certain QoS constraints and maximum available power constraints. These constraints are formulated to guarantee some fairness among users per cell and achieve a required illumination, respectively. Two types of energy efficiency measures are known, which are average per-cell energy efficiency and global EE. To determine the average per-cell EE, define $\eta_c$ as the energy efficiency at the cell c, hence the average per cell energy efficiency EE of the whole network is defined as $$EE = \frac{1}{K}\sum_{c=1}^{K} \eta_c, \quad (6)$$

where $$\eta_c = \frac{\beta \sum_{j=1}^{N_{u,c}} \log\left(1 + \frac{(\rho^2/2)P_{j,c}}{BN_0 + X_{c,j}}\right)}{\sum_{i=1}^{N_{a,c}} \sum_{j=1}^{N_{u,c}} g_{i,j}^2 P_{j,c}} \quad (7)$$

and where $P_{j,c}$ is the assigned power for the user j in the cell c, $X_{c,j}$ is the interference received at the user j in the cell c, and $\beta$ is a value which depends on the applied modulation scheme. $N_0$, $g_{ij}^2$ and B are common operational parameters of an AP, such as shown in Table I. Assuming an asymmetrically clipped optical OFDM (ACO-OFDM) modulation scheme is applied, the value of $\beta$=B/4, where B is the modulation bandwidth. In ACO-OFDM, only the odd subcarriers carry data symbols, while the even subcarriers form a bias signal which ensures that the transmitted OFDM signal meets a non-negativity requirement. More details of ACO-OFDM for IM/DD systems can be found in the following reference. (See Saju, S. and George, A., "*Comparison of ACO-OFDM and DCO-OFDM in IM/DD Systems*", International Journal of Engineering Research & Technology, ISSN: 2278-0181, Vol. 4, Issue 01, April 2015, incorporated herein by reference in its entirety).

The global energy efficiency (GEE) is the summation of the throughput of all users in all clusters over the total power consumed at all APs, which can be expressed as $$GEE = \frac{\beta \sum_{c=1}^{K} \sum_{j=1}^{N_{u,c}} \log\left(1 + \frac{(\rho^2/2)P_{j,c}}{BN_0 + X_{c,j}}\right)}{\sum_{c=1}^{K} \sum_{i=1}^{N_{A,c}} \sum_{j=1}^{N_{u,c}} g_{i,j}^2 P_{j,c}}, \quad (8)$$

Equation (8) is usually solved by a centralized approach, while equation (6) supports an efficient distributed approach. The average per-cell energy efficiency is adopted as an objective function, where the problem can be separated equivalently to K sub-problems, as there are K clusters. Therefore, the solution sub-problem for cluster c can be expressed as follows:

$$\max_{P_{j,c} j = 1, N_{u,c}} \eta_c, \quad (9a)$$

$$\text{s.t. } R_{j,c} \geq \gamma, \, j = 1, \ldots, N_{u,c}, \quad (9b)$$

$$\sum_{j=1}^{N_{u,c}} g_{i,j}^2 P_{j,c} \leq p_{max}, \, i = 1, \ldots, N_{A,c}, \quad (9c)$$

$$P_j \geq 0 \quad (9d)$$
$$j = 1, \ldots, N_{u,c}.$$

where $$R_{j,c} = \beta \log\left(1 + \frac{\left(\frac{\rho^2}{2}\right)P_{j,c}}{BN_0 + X_{c,j}}\right)$$

is the achievable rate at the user j in the cell c, $\gamma$ is the minimum required data rate, and $p_{max}$ is the maximum power available at the APs. Equations (9a-d) must be implemented in each cell independently aiming to maximize the summation of the energy efficiency in the whole network. Equations (9a-d) are not easily solved because the inter-cell interference terms depend on the allocated powers and the power allocation problem depends on the interference terms. In order to simplify this problem, equations (9a-d) are solved under the worst case where the interference is assumed to be at its maximum value, which happens when all the APs are assumed to transmit at their maximum power.

The objective function $R_{jc}$ in equations (9a-d) is a ratio of two functions (concave in the numerator and a linear function in the denominator), which is generally considered as a non-convex function. It is noted that there is no standard approach for solving non-convex problems. However, this class of problems, which are called fractional programming, can be solved using the Dinkelbach method that transforms this problem into a successive concave functions. (See W. Dinkelbach, "On nonlinear fractional programming," *Management Science*, vol. 13, no. 7, pp. 492-498, 1967, incorporated herein by reference in its entirety). Using the Dinkelbach method, the objective function in equations (9a-d) can be transformed to $$\max_{P_{j,c},\ j=1,N_{uc}} \beta \sum_{j=1}^{N_{u,c}} \log\left(1 + \frac{(\rho^2/2)P_{j,c}}{BN_0 + X_{c,j}}\right) \quad (10a)$$

$$-q_c \sum_{i=1}^{N_{A,c}} \sum_{j=1}^{N_{u,c}} g_{i,j}^2 P_{j,c} \quad (10b)$$

such that (9a), 9b) and (9c) are satisfied
where $q_c$ is a variable introduced to be solved or selected to have the above function equal to zero at the solution. If $q_c$ is given, equation (10) is concave and can be solved using the sub-gradient method of S. Boyd and L. Vandenberghe. (See S. Boyd and L. Vandenberghe, *Convex Optimization*. Cambridge University Press, 2004, incorporated herein by reference in its entirety).

The Dinkelbach algorithm is used to find the value of $q_c$ by:
Step 1) put $q_c=0$ as an initial value,
Step 2) solve equation (10) and let $P_{j,c}^*$ be the best solution,
Step 3) update $q_c$ by $$q_c = \frac{\beta \sum_{j=1}^{N_{u,c}} \log\left(1 + \frac{(\rho^2/2)P_{j,c}^*}{BN_0 + X_{c,j}}\right)}{\sum_{i=1}^{N_{A,c}} \sum_{j=1}^{N_{u,c}} g_{i,j}^2 P_{j,c}^*}$$

Step 4) repeat Step 2 and Step 3 until the objective function of equation (10) is close to the zero value.

B. AP Selection

In an aspect of the present disclosure, the APs which participate in communication are selected. A description follows of the selection of these APs with the goal of minimizing inter-cell interference. It is clear that, under an ideal power allocation strategy, as the number of participating APs in the transmission increase, the energy efficiency is enhanced as long as inter-cell interference is avoided.

The APs are first classified into three categories: 1) the APs that have zero channels to all users, 2) the APs that have channels to associated users but zero channels to the users belonging to other cells (i.e. non-interfering APs), 3) the interfering APs that have LoS to their associated users and also have LoS to the users in the other clusters (i.e. interfering APs). The second type of the APs must be switched on because their participation in the communication improves the energy efficiency as long as the power allocation problem is applied. In the third type (interfering APs), each one of the APs has to be selected carefully to be switched on or switched off. The participation of these APs improves the energy efficiency in their own cells, but on the other hand, reduces the energy efficiency of the other cells by causing inter-cell interference. Thus, in the following, a metric is established that approximately measures the eligibility of each AP to participate in the communication (in the event it causes non-zero inter-cell interference). This metric of the AP i in cluster c can be given by $$\gamma_{i,c} = \frac{\sum_{j \in c} h_{j,i}^2}{\sum_{j \notin c} h_{j,i}^2} \text{ for all instances of } i, c \quad (11)$$

A high value of $\gamma_{i,c}$ means that the quality of the information signal coming from the AP i to the intended users is much greater than the emitted interference from that AP and vice versa. It is important to note that the APs selection highly depends on the allocated power since allocating the power for the users is also allocating the transmit powers at the APs. Consequently, the APs selection and the power allocation problems are interlinked, leading to an iterative algorithm to find the joint solution for both selection and power.

Algorithm 2 below solves for the power allocation and selection of the APs alternatively until they converge. The APs are sorted ascendingly based on their $\gamma_{i,c}$ values, which guarantees the satisfaction of the condition that the number of active APs is greater than the number of users in each cluster with the APs that have highest $\gamma_{i,c}$. In addition, sorting the APs ascendingly increases the rate of convergence significantly. Algorithm 2 converges because with each change in the AP status in Step 3, the energy efficiency either improves or remains as is.

Algorithm 2—Joint AP Selection and Power Allocation for Energy Maximization EE.

Step 1) Find all interfering APs and sort ascendingly based on their $\gamma_{i,c}$ values.
Step 2) For each q=1:L
Step 3) For each interfering AP, starting from the AP which has the lowest $\gamma_{i,c}$ value, change its status (if ON, switch OFF; if OFF, switch ON) under the condition that the number of active APs is greater than the number of users in each cluster.
Step 4) Implement the power allocation problem and check if the EE is improved. If not, return the AP to its previous status.
Step 5) If (EE(q−1)−EE(q)<c), break.
Step 6) End for.

Figure 6:
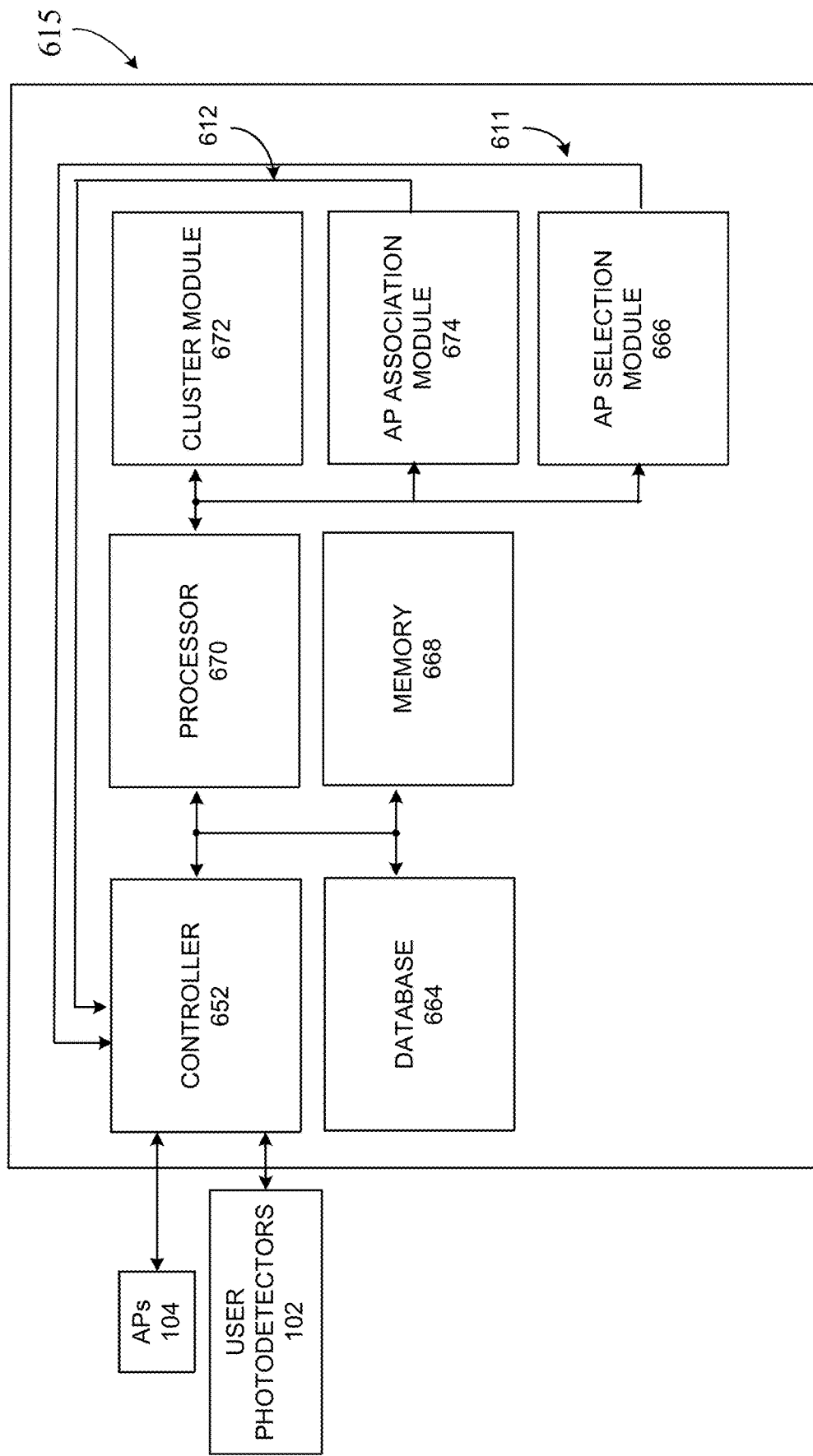
FIG. 6 is an exemplary illustration of a control environment used to operate the system, according to certain embodiments.

FIG. 6 illustrates the control system 615 of the present disclosure which solves the clustering and AP selection. AP data, which includes AP location, power parameters, operational parameters, noise, etc. as shown in Table 1, is transmitted to controller 652 and stored in database 664. Additionally, controller 652 receives data regarding the location of each photodetector, which may be determined by the controller by signaling or which may be programmed into the control system during design and layout of the devices in a room and stored in database 664. The control system includes a processor 670 connected to the controller, a memory 668 including program instructions, wherein the processor includes analysis circuitry configured to use the program instructions to analyze information received from controller 652 to determine the clustering of the users in cluster module 672, association of APs with the users by AP association module 674 and selection of the ON or OFF status of an AP in AP selection module 666. The AP assignments and the AP selections are fed back to the controller on lines 612 and 611 respectively.

In operation, the processor retrieves Algorithm 1 from memory 668 and runs the algorithm in cluster module 672 to form the user clusters. Once the user clusters are formed, the processor 670 associates the APs with the user clusters in AP association module 674. The AP association is fed back to the controller on feedback line 612 to the controller, which assigns channel links between the APs and the user photodetectors based on the clustering. The controller continually receives data regarding the QoS of the transmissions between the APs and users and instructs the processor to retrieve Algorithm 2 from memory 668 and utilize algorithm to select the APs to be ON or OFF to manage the inter-cell interference.

Figure 7:
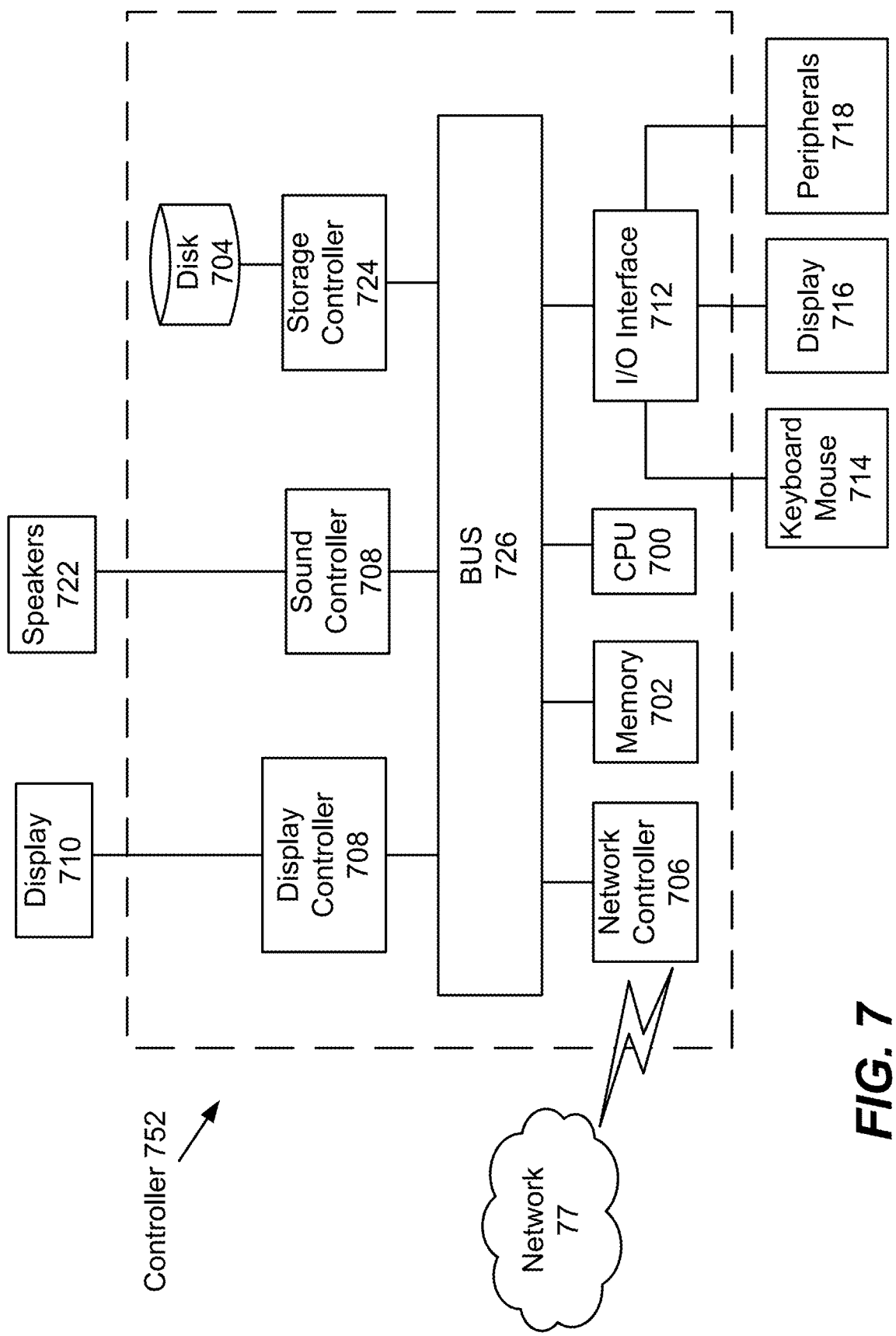
FIG. 7 is an exemplary illustration of computing hardware used in the controller of the exemplary embodiments.

The controller may include a display 716, keyboard 714 or other peripherals 718 shown in FIG. 7 which enable the controller to display the room APs and users to a system operator, along with parameters of operation, such as power, transmission, QoS, etc.

A first embodiment of the present disclosure is shown in FIG. 1A, 1B, 1C, 6. The first embodiment describes a system for joint power allocation and cell formation for energy efficient (EE) visible light communication (VLC) networks. The system includes a visible light communication network (FIG. 1A) including a plurality of light-emitting diode (LED) access points (AP) 102, a plurality of photodetectors 104, wherein each photodetector is connected to a user device and a control system 615. The control system 615 is connected to the plurality of light-emitting diode (LED) 114 access points 102 and is wirelessly connected by visible light line-of-sight communication channels 118 to the plurality of photodetectors (FIG. 1B). As seen in FIG. 1B, the light transmitted from the LEDs of each access point 102 makes an angle φ with the direct line-of-sight 115 between the transmitting LEDs 114 and the receiving photodetector 116 of user 104. The angle at which the light is received at the photodetector 116 makes an angle θ with the direct line-of-sight. Note that the AP 102 is separated from the user 104 photodetector receiver 116 by a distance d. The controller causes the LEDs 114 at an access point 102 to transmit an information signal to the photodetectors using intensity modulation.

The control system 615 includes a controller 652; a memory 668 connected to the controller and including program instructions to perform power allocation, cell formation, clustering, association of the APs with the clusters and other features of the present disclosure.

A database 664 is optionally connected to the controller, the database storing system parameters, such as specifications, settings, thresholds, operating points, power requirements, etc. as needed by the controller and processor to perform the clustering, AP association, AP selection, modulation, etc. of a VLC system.

A processor 670 connected to the controller, optionally database 664 and memory 668, the processor including analysis circuitry configured to use the program instructions stored in the memory to analyze information received from controller to determine clusters of the user devices 102, form cells of APs by associating APs with the user devices, determine the inter-cell interference between the cells of APs, and calculate an energy efficiency of each cluster and a global energy efficiency of the visible light communication (VLC) network.

Based on analysis by the processor, the controller associates each AP with a selected cluster of user devices and adjusts the status of the plurality of APs based on the inter-cell interference and the global energy efficiency. Adjusting the status of an AP is defined as turning the AP ON or OFF.

The processor 670 of the control system uses the cluster module 672 to group the user devices into K clusters, wherein K is a predefined number based on the number of APs in the system and wherein and the distances between the K clusters are $d_{i,j}$, i=1, ..., K, j=i+1, ..., K. Each cluster j has a cluster center $c_k$ and the user devices in the cluster j are chosen so that the sum of the squares of the distances between each user device and the cluster center $c_k$ in the cluster K is less than a first predefined threshold U.

The cluster centers $c_k$ are determined such that the product of the distances between all cluster centers is maximized such that the sum of the distances is less than or equal to a second predefined threshold D.

The processor associates a first set of APs of the plurality of APs with a user device by finding a maximum channel value between a first AP of the first set and a first user device, This channel value $h_{i,j}$ is given by the equation:

$$h_{i,j}^{(v)} = \frac{(m+1)A_P}{2\pi d_{i,j}^2} \cos^m(\phi) g_{of} f(\theta) \cos(\theta),$$

where $m=-1/\log_2(\cos(\theta_{1/2}))$, where $\theta_{1/2}$ is a half intensity radiation angle defined by the line-of-sight relationship of the AP and the photodetector, $A_p$ is a physical area of the photodetector, $d_{i,j}$ is the distance between the $i^{th}$ LED of the first AP to the $j^{th}$ user device, $g_{of}$ is the gain of the optical filter of the photodetector, φ is the angle of irradiance at the LEDs of the first AP, θ is an angle of incidence as seen at the photodetector, and f(θ) is an optical concentrator gain of the photodetector, which is a function of θ that is given by $$f(\theta) = \frac{n^2}{\sin^2(\Theta)} \text{ if } \theta \leq \Theta \text{ or } 0 \text{ if } \theta > \Theta,$$

where n is the refractive index and Θ is the semi-angle of the field-of-view (FOV) of the photodetector. These parameters of the system are stored in the database 664.

The processor uses AP Association Module 674 to determine the association between each AP and user. The module 674 assigns the first AP to the first user device and repeats until all users are associated with an AP. As there are many more APs than user clusters, the module 674 then continues by assigning the unassigned APs of the plurality of APs to the K clusters by finding the average channel value all APs to all users in a cluster c based on $$\hat{d}_{i,c} = \sum_{j \in c} h_{j,i}^2, c = 1, \ldots, K, i = 1, \ldots, N_A$$

and associating each AP i to the cluster that satisfies the relationship $$I_i = \max_c(\hat{d}_{i,c}), c=1, \ldots, K, \text{ where } I_i \text{ is the AP index}.$$

The processor of the control system then calculates the average per-cell energy efficiency, EE of the network based on $$EE = \frac{1}{K} \sum_{c=1}^{K} \eta_c, \text{ where } \eta_c = \frac{\beta \sum_{j=1}^{N_{u,c}} \log\left(1 + \frac{(\rho^2/2)P_{j,c}}{BN_0 + X_{c,j}}\right)}{\sum_{i=1}^{N_{A,c}} \sum_{j=1}^{N_{u,c}} g_{i,j}^2 P_{j,c}}$$

where $P_{j,c}$ is an assigned power for a user j in a cell c, $X_{c,j}$ is the interference received at the user j in the cell c, and $\beta$, $N_0$, $g_{ij}^2$ and B are predetermined operational parameters of an AP.

The processor of the control system further calculates the global energy efficiency, GEE, based on:

$$GEE = \frac{\beta \sum_{c=1}^{K} \sum_{j=1}^{N_{u,c}} \log\left(1 + \frac{(\rho^2/2)P_{j,c}}{BN_0 + X_{c,j}}\right)}{\sum_{c=1}^{K} \sum_{i=1}^{N_{A,c}} \sum_{j=1}^{N_{u,c}} g_{i,j}^2 P_{j,c}}$$

where $P_{j,c}$ is the assigned power for a user j in a cell c, $X_{c,j}$ is the interference received at the user j in the cell c, and $\beta$ is a predefined intensity modulation value, and $N_0$, $g_{ij}^2$ and B are constants representing operational parameters of the APs stored in the database.

Determining the inter-cell interference includes measuring the strength of a signal received at a user device and the interference at the user device and calculating the ratio, $\gamma_{i,c}$, of the square of the signal strength to the interference.

The processor then proceeds by sorting the APs by their $\gamma_{i,c}$ ratios; calculating a first global energy efficiency; for each AP, starting from the AP having the lowest $\gamma_{i,c}$ ratio, determining whether the number of active APs is greater than the number of users in each cluster; if the number of active APs is not greater than the number of users in each cluster, stops determining the inter-cell interference. However, if the number of active APs is greater than the number of users in each cluster, changing the status of the AP having the lowest $\gamma_{i,c}$ ratio.

The processor continues adjusting the status of the APs by calculating a second global energy efficiency; comparing the second global energy efficiency to the first global energy efficiency; and, if the second global energy efficiency is not greater than the first global energy efficiency, stops determining the inter-cell interference.

However, if the second global energy efficiency is greater than the first global energy efficiency, the processing continues by changing the status of the AP having the third lowest $\gamma_{i,c}$ ratio, calculating a third global energy efficiency and comparing the third global energy efficiency to the second global energy efficiency. If the third global energy efficiency is not greater than the second global energy efficiency, the processor stops determining the inter-cell interference.

However, if the third global energy efficiency is greater than the second global energy efficiency, the processor continues changing the status of each AP having the next lowest $\gamma_{i,c}$ ratio, calculating the next global energy efficiency, and comparing to the previous global energy efficiency until the difference between the next global energy efficiency, and the previous global energy efficiency equals zero.

The second embodiment of the present disclosure is shown in FIG. 1A, 1B, 1C, 6. The second embodiment describes a method for joint power allocation and cell formation for energy efficient (EE) visible light communication (VLC) networks. The second embodiment describes the operation of the VLC communication network, and includes grouping, by a control system 615, a plurality of users 102 into user centric clusters based on their distance to each other; forming, by the control system, cells of a plurality of access points, AP 104, by associating an access point to each user centric cluster, wherein associating is based on maximizing cell capacity within each cell and minimizing inter-cell interference from other cells; allocating power, by the control system, to the APs associated with each user cluster to maximize the energy efficiency (EE) of each user centric cluster; calculating, by the control system an inter-cell interference, an energy efficiency of each cluster and a global energy efficiency of the visible light communication (VLC) network; and adjusting, by the control system, the operational status of each one of the plurality of APs based on the inter-cell interference and the global energy efficiency.

The method proceeds by grouping, by the control system 615, the users into K clusters, wherein K is a predefined number based on the number of APs in the system and wherein and the distances between the K clusters are $d_{i,j}$, i=1, . . . , K, j=i+1, . . . , K; choosing, by the control system, a cluster center $c_k$ and the users for each cluster j so that the sum of the squares of the distances between each user and the cluster center $c_k$ in the cluster K is less than a first predefined threshold U; wherein the cluster centers $c_k$ are determined such that the product of the distances between all cluster centers is maximized such that the sum of the distances is less than or equal to a second predefined threshold D.

In the method of the second embodiment, associating an access point (AP) maximizes a cell capacity and minimizes an inter-cell interference in the other cells, such that the global and cell cluster energy efficiencies are maximized.

In a further feature of the second embodiment, the method includes intensity modulating a light signal applied to a plurality of LEDs included in each access point to transmit information signals to a plurality of users in a cluster associated with the access point, wherein each user includes a photodetector for receiving the light signal.

In the second embodiment, the method continues by the control system grouping the users into K clusters, wherein K is a predefined number based on the number of APs in the system and wherein and the distances between the K clusters are $d_{i,j}$, i=1, . . . , K, j=i+1, . . . , K; and choosing, by the control system, a cluster center $c_k$ and the users for each cluster j so that the sum of the squares of the distances between each user and the cluster center $c_k$ in the cluster K is less than a first predefined threshold U. The cluster centers $c_k$ are determined such that the product of the distances between all cluster centers is maximized such that the sum of the distances is less than or equal to a second predefined threshold D., The method proceeds by associating, by the control system, a first set of APs of the plurality of APs with a user by finding a maximum channel value between a first AP of the first set and a first user, wherein the channel value $h_{i,j}$ is given by:

$$h_{i,j}^{(v)} = \frac{(m+1)A_p}{2\pi d_{i,j}^2} \cos^m(\phi) g_{of} f(\theta) \cos(\theta), \text{ where}$$

$m=-1/\log_2(\cos(\theta_{1/2}))$, where $\theta_{1/2}$ is a half intensity radiation angle defined by the line-of-sight relationship of the access point and the photodetector, $A_p$ is a physical area of the photodetector, $d_{i,j}$ is the distance between the $i^{th}$ LED of the first AP to the $j^{th}$ user device, $g_{of}$ is the gain of the optical filter of the photodetector, $\phi$ is the angle of irradiance at the LEDs of the first AP, $\theta$ is an angle of incidence as seen at the photodetector, and $f(\theta)$ is an optical concentrator gain of the photodetector, which is a function of $\theta$ that is given by $$f(\theta) = \frac{n^2}{\sin^2(\Theta)}$$

if $\theta \leq \Theta$ or 0 if $\theta > \Theta$, where n is the refractive index and $\Theta$ is the semi-angle of the field-of-view (FOV) of the photodetector.

The method continues by assigning, by the control system, the first AP to the first user device and repeating until all users are associated with an AP. Since there are many more APs than user clusters, the control system continues assigning the unassigned APs of the plurality of APs to the K clusters by finding the average channel value all APs to all users in a cluster c based on:

$$\hat{d}_{i,c} = \sum_{j \in c} h_{j,i}^2, c = 1, \ldots, K, i = 1, \ldots, N_A.$$

and associating, by the control system, each AP i to the cluster that satisfies the relationship:

$I_i = \max_c(\hat{d}_{i,c}), c=1, \ldots, K$, where $I_i$ is the AP index.

calculating, by the control system, the average per-cell energy efficiency, EE of each cluster based on $$EE = \frac{1}{K} \sum_{c=1}^{K} \eta_c, \text{ where } \eta_c = \frac{\beta \sum_{j=1}^{N_{u,c}} \log\left(1 + \frac{(\rho^2/2)P_{j,c}}{BN_0 + X_{c,j}}\right)}{\sum_{i=1}^{N_{A,c}} \sum_{j=1}^{N_{u,c}} g_{i,j}^2 P_{j,c}}$$

where $P_{j,c}$ is an assigned power for a user j in a cell c, $X_{c,j}$ is the interference received at the user j in the cell c, and $\beta$, $N_0$, $g_{ij}^2$ and B are predetermined operational parameters of an AP.

The method further continues by calculating, by the control system, the global energy efficiency, GEE, of the network based on:

$$GEE = \frac{\beta \sum_{c=1}^{K} \sum_{j=1}^{N_{u,c}} \log\left(1 + \frac{(\rho^2/2)P_{j,c}}{BN_0 + X_{c,j}}\right)}{\sum_{c=1}^{K} \sum_{i=1}^{N_{A,c}} \sum_{j=1}^{N_{u,c}} g_{i,j}^2 P_{j,c}}$$

where $P_{j,c}$ is the assigned power for a user j in a cell c, $X_{c,j}$ is the interference received at the user j in the cell c, and $\beta$ is a predefined intensity modulation value, and $N_0$, $g_{ij}^2$ and B are constants representing operational parameters of the AP stored in the database.

The method includes determining the inter-cell interference by measuring the strength of a signal received at a user device and the interference at the user device and calculating the ratio, $\gamma_{i,c}$, of the square of the signal strength to the interference.

Adjusting the status of the APs includes sorting the APs by their $\gamma_{i,c}$ ratios; calculating a first global energy efficiency. Then, for each AP, starting from the AP having the lowest $\gamma_{i,c}$ ratio, determining whether the number of active APs is greater than the number of users in each cluster. If the number of active APs is not greater than the number of users in each cluster, stop determining the inter-cell interference; but if the number of active APs is greater than the number of users in each cluster, changing the status of the AP having the lowest $\gamma_{i,c}$ ratio and calculating a second global energy efficiency. The processing then proceeds by comparing the second global energy efficiency to the first global energy efficiency; and if the second global energy efficiency is not greater than the first global energy efficiency, stops determining the inter-cell interference. However, if the second global energy efficiency is greater than the first global energy efficiency, the control system proceeds by changing the status of the AP having the third lowest $\gamma_{i,c}$ ratio, calculating a third global energy efficiency and comparing the third global energy efficiency to the second global energy efficiency; ceasing the determination of the inter-cell interference if the third global energy efficiency is not greater than the second global energy efficiency, but continuing to change the status of each AP having the next lowest $\gamma_{i,c}$ ratio if the third global energy efficiency is greater than the second global energy efficiency. The method then continues calculating the next global energy efficiency, and comparing to the previous global energy efficiency until the difference between the next global energy efficiency, and the previous global energy efficiency equals zero.

The third embodiment describes a non-transitory computer readable medium having instructions stored therein that, when executed by one or more processors, causes the one or more processors to perform a method for joint power allocation and cell formation for energy efficient (EE) visible light communication (VLC) networks, as shown in FIG. 1A-1C, 6.

The method includes grouping, by a control system 615 including at least a controller 652, a memory 668, a database 664, and the one or more processors 670, a plurality of users 102 into user centric clusters based on their distance to each other; forming, by the control system, cells of a plurality of access points, APs 104, by associating an access point to each user centric cluster, wherein associating is based on maximizing cell capacity within each cell and minimizing inter-cell interference from other cells; allocating power, by the control system, to the APs associated with each user cluster to maximize the energy efficiency (EE) of each user centric cluster, and calculating, by the control system, an inter-cell interference, an energy efficiency of each cluster and a global energy efficiency of the visible light communication (VLC) network. The control system continues the method by adjusting the operational status of each AP of the plurality of APs based on the inter-cell interference and the global energy efficiency.

The computer readable medium method further comprises grouping, by the control system, the users into K user centric clusters, wherein K is a predefined number based on the number of APs in the system and wherein and the distances between the K clusters are $d_{i,j}$, i=1, ..., K, j=i+1, ..., K; choosing, by the control system, a cluster center $c_k$ and the users for each cluster j so that the sum of the squares of the distances between each user and the cluster center $c_k$ in the cluster K is less than a first predefined threshold U. The cluster centers $c_k$ are determined such that the product of the distances between all cluster centers is maximized such that the sum of the distances is less than or equal to a second predefined threshold D.

The computer readable medium method further includes intensity modulating, by the control system, a light signal applied to a plurality of LEDs included in each access point to transmit information signals to a plurality of users in a cluster associated with the access point, wherein each user 102 includes a photodetector 116 for receiving the light signal.

The method includes associating, by the control system, a first set of APs of the plurality of APs with a user by finding a maximum channel value between a first AP of the first set and a first user, wherein the channel value $h_{i,j}$ is given by:

$$h_{i,j}^{(v)} = \frac{(m+1)A_p}{2\pi d_{i,j}^2} \cos^m(\phi) g_{of} f(\theta)\cos(\theta), \text{ where}$$

m=−1/log$_2$(cos(θ$_{1/2}$)), where θ$_{1/2}$ is a half intensity radiation angle defined by the line-of-sight relationship of the access point and the photodetector, $A_p$ is a physical area of the photodetector, $d_{i,j}$ is the distance between the $i^{th}$ LED of the first AP to the $j^{th}$ user device, $g_{of}$ is the gain of the optical filter of the photodetector, φ is the angle of irradiance at the LEDs of the first AP, θ is an angle of incidence as seen at the photodetector, and f(θ) is an optical concentrator gain of the photodetector, which is a function of θ that is given by $$f(\theta) = \frac{n^2}{\sin^2(\Theta)}$$

if θ≤Θ or 0 if θ>Θ, where n is the refractive index and Θ is the semi-angle of the field-of-view (FOV) of the photodetector. These physical values of the system are stored in database 664.

The method continues by assigning, by the control system, the first AP to the first user device and repeating until all users are associated with an AP, assigning, by the control system, the unassigned APs of the plurality of APs to the K clusters by finding the average channel value all APs to all users in a cluster c based on:

$$\hat{d}_{i,c} = \sum_{j \in c} h_{j,i}^2, c = 1, \ldots, K, i = 1, \ldots, N_A.$$

and associating, by the control system, each AP i to the cluster that satisfies the relationship $I_i$=max($\hat{d}_{i,c}$), c=1, ..., K, where $I_i$ is the AP index.

The computer readable medium method continues by calculating, by the control system, the average per-cell energy efficiency, EE of each cluster based on $$EE = \frac{1}{K}\sum_{c=1}^{K} \eta_c, \text{ where } \eta_c = \frac{\beta \sum_{j=1}^{N_{u,c}} \log\left(1 + \frac{(\rho^2/2)P_{j,c}}{BN_0 + X_{c,j}}\right)}{\sum_{i=1}^{N_{A,c}} \sum_{j=1}^{N_{u,c}} g_{i,j}^2 P_{j,c}}$$

where $P_{j,c}$ is an assigned power for a user j in a cell c, $X_{c,j}$ is the interference received at the user j in the cell c, and β, $N_0$, $g_{ij}^2$ and B are predetermined operational parameters of an AP; and further calculating, by the control system, the global energy efficiency, GEE, of the network based on $$GEE = \frac{\beta \sum_{c=1}^{K} \sum_{j=1}^{N_{u,c}} \log\left(1 + \frac{(\rho^2/2)P_{j,c}}{BN_0 + X_{c,j}}\right)}{\sum_{c=1}^{K} \sum_{i=1}^{N_{A,c}} \sum_{j=1}^{N_{u,c}} g_{i,j}^2 P_{j,c}}$$

where $P_{j,c}$ is the assigned power for a user j in a cell c, $X_{c,j}$ is the interference received at the user j in the cell c, and β is a predefined intensity modulation value, and $N_0$, $g_{ij}^2$ and B are constants representing operational parameters of the AP stored in the database.

Once the clusters and AP associations are established, the control system determines the inter-cell interference by measuring the strength of a signal received at a user device and the interference at the user device and calculating the ratio, $\gamma_{i,c}$, of the square of the signal strength to the interference.

The computer readable medium method maximizes the global energy efficiency by sorting the APs by their $\gamma_{i,c}$ ratios; calculating a first global energy efficiency; then, for each AP, starting from the AP having the lowest $\gamma_{i,c}$ ratio, determining whether the number of active APs is greater than the number of users in each cluster. If the number of active APs is not greater than the number of users in each cluster, the method stops determining the inter-cell interference, however, if the number of active APs is greater than the number of users in each cluster, the control system continues the adjusting by changing the status of the AP having the lowest $\gamma_{i,c}$ ratio; calculating a second global energy efficiency; comparing the second global energy efficiency to the first global energy efficiency; and if the second global energy efficiency is not greater than the first global energy efficiency, stops determining the inter-cell interference. However, if the second global energy efficiency is greater than the first global energy efficiency, the adjusting includes changing the status of the AP having the third lowest $\gamma_{i,c}$ ratio, calculating a third global energy efficiency and comparing the third global energy efficiency to the second global energy efficiency; whereupon the method includes ceasing the determination of the inter-cell interference if the third global energy efficiency is not greater than the second global energy efficiency, and continuing to change the status of each AP having the next lowest $\gamma_{i,c}$ ratio if the third global energy efficiency is greater than the second global energy efficiency. The method then proceeds by calculating the next global energy efficiency, and comparing to the previous global energy efficiency until the difference between the next global energy efficiency, and the previous global energy efficiency equals zero.

In the following, the ability of the algorithms of the present disclosure to enhance the performance of a VLC network is verified. The convergence of the proposed algorithms and their effect on enhancing the energy efficiency is demonstrated.

In a non-limiting example, a 15×15 room area is shown with 64 VLC APs fixed in the ceiling as shown in FIG. 1A. The values of all operational parameters used in the VLC system are given in Table I.

Monte-Carlo simulation is used to assess the performance of the proposed algorithms, where in each simulation iteration, a uniform random user distribution is generated. In general, in a Monte Carlo simulation, a random value is selected for each of tasks, based on a range of estimates. The model is calculated based on this random value. The result of the model is recorded, and the process is repeated. A typical Monte Carlo simulation calculates the model hundreds or thousands of times, each time using different randomly-selected values. When the simulation is complete, a large number of results are obtained from the model, each based on random input values. These results are used to describe the likelihood, or probability, of reaching various results in the model. In a non-limiting example, 150 different user's distributions were generated and the proposed algorithms were applied to find the energy efficiency (EE) for each user's distribution, then the 150 results were average to find the average system EE.

Figure 2:
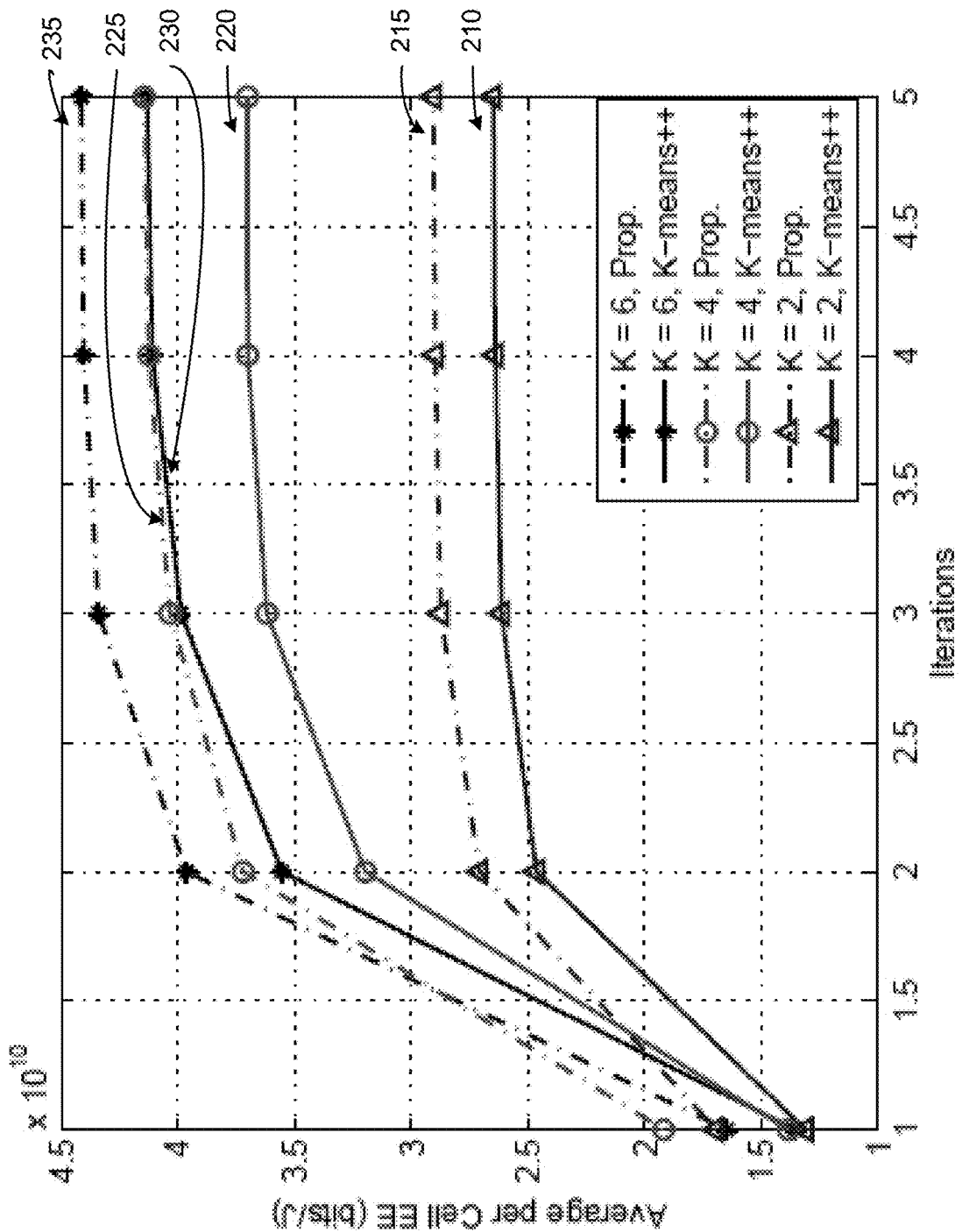
FIG. 2 is a graph illustrating energy efficiency versus number of iterations of Algorithm 2 for different numbers of clusters.

The simulation results are shown in FIG. 1-5. FIG. 2 shows the convergence of Algorithm 2. It is clear that Algorithm 2 needs at most three iterations to converge. Furthermore, the number of iterations needed to converge does not depend on the number of clusters in the system. In addition, it can be seen that only the first iteration yields a significant improvement in the energy efficiency of the system, especially when the number of clusters is large. FIG. 2 also shows the superiority of the proposed users clustering algorithm over the K-means++ algorithm. For K=2 centers, line 210 (solid) represents the K-means++ method and line 215 (dotted) is found by Algorithm 2. It is clear that the algorithm converges at two iterations and that the average energy efficiency per cell is approximately 0.25×10¹⁰ bits/J higher for line 215. This result is again demonstrated for K=4 centers, where line 220 (solid) is found using the K-means++ algorithm and line 225 (dotted) is found by algorithm 2, and shows the improvement in the average energy efficiency per cell is approximately 0.5×10¹⁰ bits/J higher for line 225. For K=6 centers, there is an improvement of approximately 0.25×10¹⁰ bits/J between the result from Algorithm 2 shown in line 235 over the K-means++ results shown in line 230 (solid).

Figure 3:
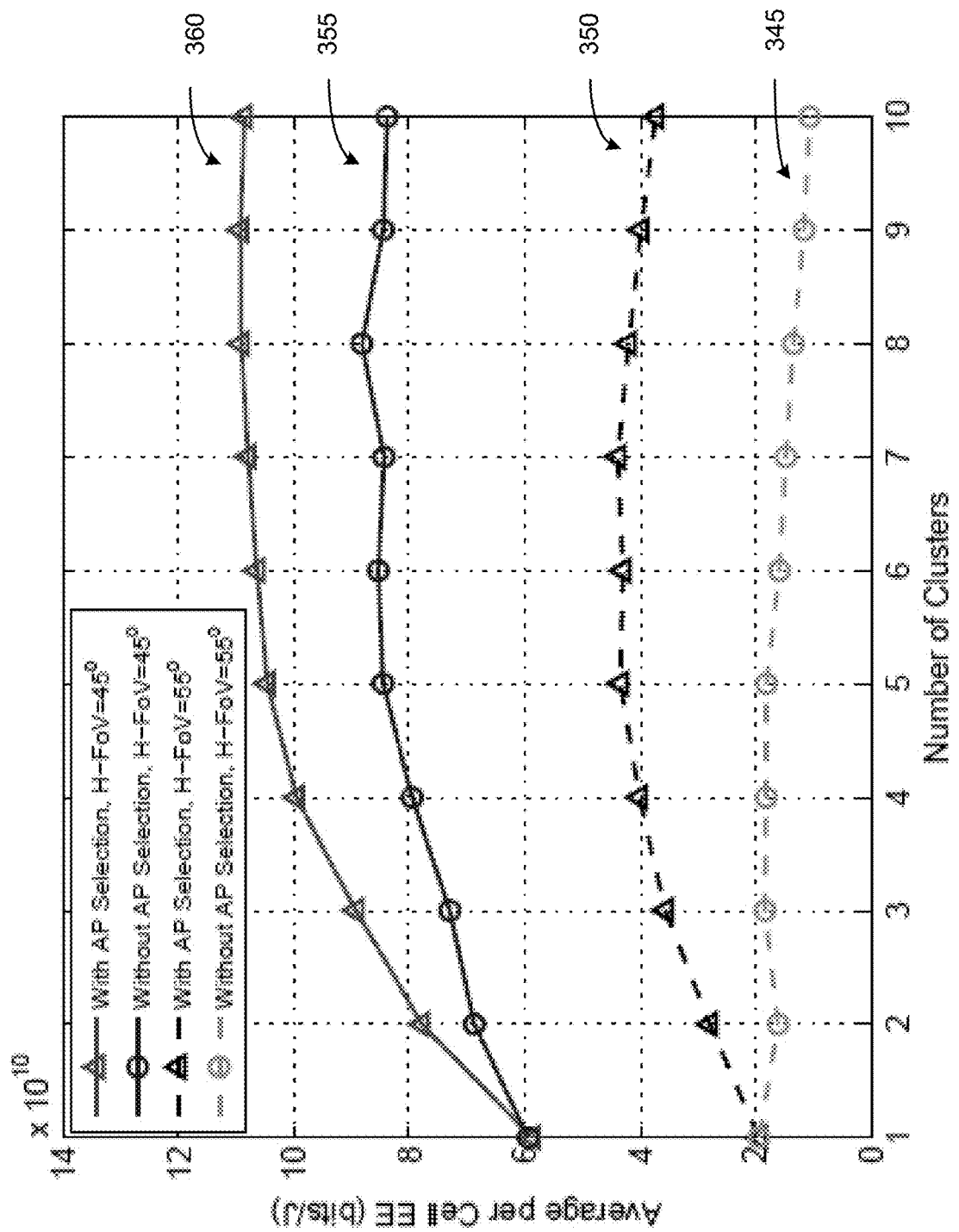
FIG. 3 is a graph illustrating the comparison between applying AP selection versus full AP participation by plotting energy efficiency versus number of clusters with different H-FoV.

FIG. 3 illustrates how the energy efficiency behaves as the number of cell clusters increase for Field of View (FOV) angles of 45 and 55 degrees. Further shown is the significant improvement in the energy efficiency by applying Algorithm 2 compared to allowing the participation of all APs in the transmission. This figure shows unexpected results since it is known that as the number of cells increases, the inter-cell interference increases, which degrades the EE. However, FIG. 3 shows that the average per-cell energy efficiency increases and then decreases slightly with the number of cells, which means that there is another factor that aids in enhancing the average per-cell energy efficiency as the number of cells increases. Apparently, this factor has greater impact when the inter-cell interference is small which occurs when the number of clusters is small or when the H-FoV is small. The EE is approximately 2×10¹⁰ bits/J greater between line 345 (without AP selection, FOV=55) and line 350 (with AP selection, FOV=55) and shows degradation in EE for both at greater than 6 clusters. There is much higher energy efficiency when the FOV=45 degrees, which is expected as less energy is lost in the channel. Line 355 (without AP selection, FOV=45) and line 360 (with AP selection, FOV=45) both show approximately 4×10¹⁰ bits/joule over lines 345 and 350 respectively. At FOV=45 degrees, the energy efficiency is approximately constant as the number of clusters increase.

Figure 4:
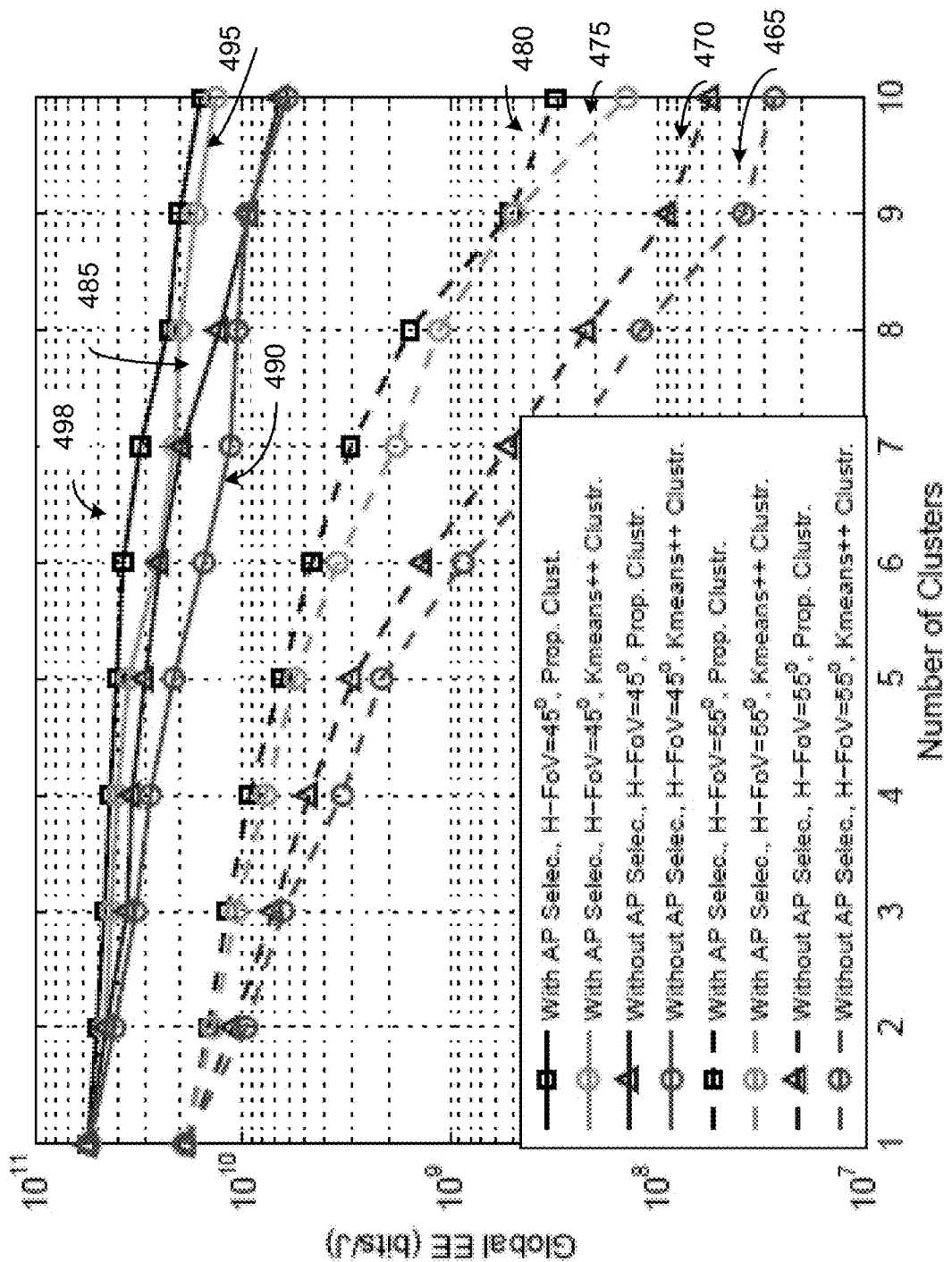
FIG. 4 is a graph illustrating the comparison between applying AP selection versus full AP participation by plotting Global energy efficiency versus number of clusters with different H-FoV.

On the other hand, the global energy efficiency decreases with increasing cell numbers as shown in FIG. 4, which means that this factor is approximately absent in global EE. The reason behind that is the definition of both the average per-cell energy efficiency and the global EE. If $x_1$, $x_2$, $y_1$, and $y_2$ are any positive numbers, it is easy to show that $$\frac{x_1+x_2}{y_1+y_2} < \frac{x_1}{y_1} + \frac{x_2}{y_2}.$$

This means if it is supposed that the interference and the received powers at all users remain fixed with increasing the number of clusters, mathematically, it is found that $$\underbrace{\frac{\sum_{c=1}^{K}\sum_{j=1}^{N_{u,c}} R_{j,c}}{\sum_{c=1}^{K}\sum_{j=1}^{N_{A,c}} p_{j,c}}}_{\text{Global EE}} < \underbrace{\frac{\sum_{j=1}^{N_{u,1}} R_{j,1}}{\sum_{j=1}^{N_{A,1}} p_{j,1}} + \frac{\sum_{j=1}^{N_{u,2}} R_{j,2}}{\sum_{j=1}^{N_{A,2}} p_{j,2}}}_{K=2} < \underbrace{\frac{\sum_{j=1}^{N_{u,1}} R_{j,1}}{\sum_{j=1}^{N_{A,1}} p_{j,1}} + \frac{\sum_{j=1}^{N_{u,2}} R_{j,2}}{\sum_{j=1}^{N_{A,2}} p_{j,2}} + \frac{\sum_{j=1}^{N_{u,3}} R_{j,3}}{\sum_{j=1}^{N_{A,3}} p_{j,3}}}_{K=3} \quad (12)$$

The inequality above can be extended to $K=N_u$. Hence, when the amount of increased interference as the number of cells are increased is small, this factor dominates and leads to increase the average per-cell energy efficiency with the number of cells. FIG. 4 confirms the above argument by showing that the GEE decreases as the number of clusters is increased. This is because the only factor that affects the GEE due to the increase of the number of cells is the inter-cell interference. FIG. 4 also shows that user clustering algorithm 2 outperforms the K-means++ algorithm in terms of GEE. Further, Algorithm 2 provides a significant improvement in GEE as shown in FIG. 4. Lines 465 (without AP selection, H-FOV=55, K-means++) shows less global EE than line 470 (without AP selection, H-FOV=55, clustering of the present invention), but both show marked decrease in EE with increasing clusters. Line 475 (with AP selection, H-FOV=55, K-means++) and line 480 (with AP selection, H-FOV=55, clustering) are closely matched, which demonstrates that AP selection has a great effect on EE for either clustering scheme, but also decreases with increasing clusters for both. Line 485 (without AP selection, H-FOV=45, K-means++) and line 490 (without AP selection, H-FOV=45, clustering of the present invention) show some improvement in Global EE from 3-7 clusters, but are approximately the same at low and high cluster values. Line 495 (with AP selection, H-FOV=55, K-means++) and line 498 (with AP selection, H-FOV=45, clustering) show some improvement in Global EE from 3-7 clusters, but are approximately the same at low and high cluster values. Again, this demonstrates that AP selection has a great effect on EE for either clustering scheme. It should be noted that the decrease in global EE for H-FOV=45 degrees is much less marked than for H-FOV=55 degrees. This is most likely due spreading of the spectrum leading to loss of intensity.

Figure 5:
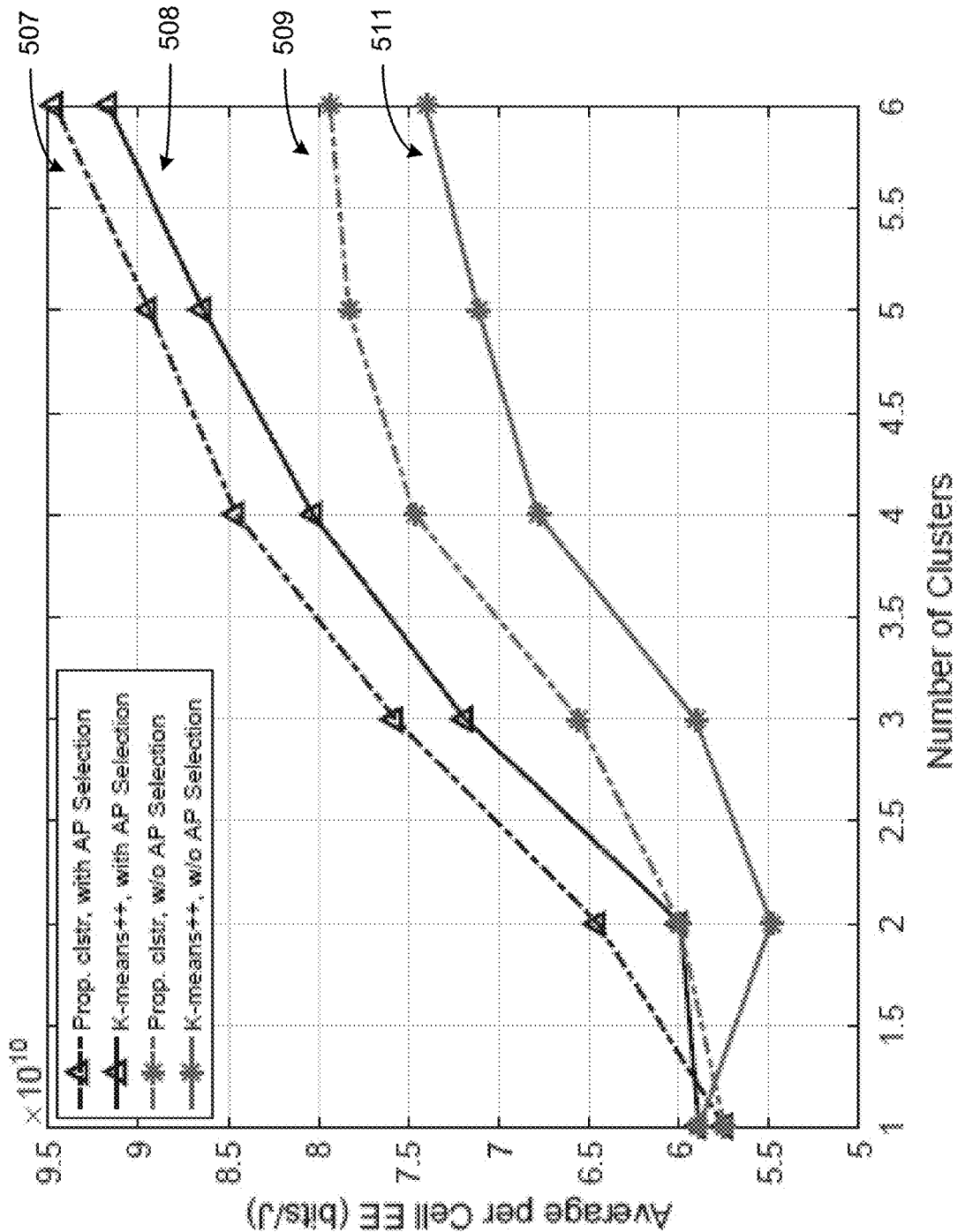
FIG. 5 is a graph illustrating the comparison between the K-means++ and the clustering method of the present disclosure with and without AP selection by plotting energy efficiency versus number of cells when H-FoV=45°.

FIG. 5 illustrates the effectiveness of algorithms 1 and 2 in improving the energy efficiency of the considered network. The best performance occurs when the AP selection is combined with the user clustering algorithm, as shown by Line 507 (clustering with AP selection) and line 508 (K-means++ with AP selection), while the worst performance happens when the K-means++ user clustering algorithm is used with all the APs participating in the communication, as shown by line 509 (clustering without AP selection) and 511 (K-means++ without AP selection).

Next, a hardware description of the controller 652 of control system 615 according to exemplary embodiments is described with reference to FIG. 7. In FIG. 7, the controller 752 described is representative of the controller 652 in which the controller is computing device which includes a CPU 700 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
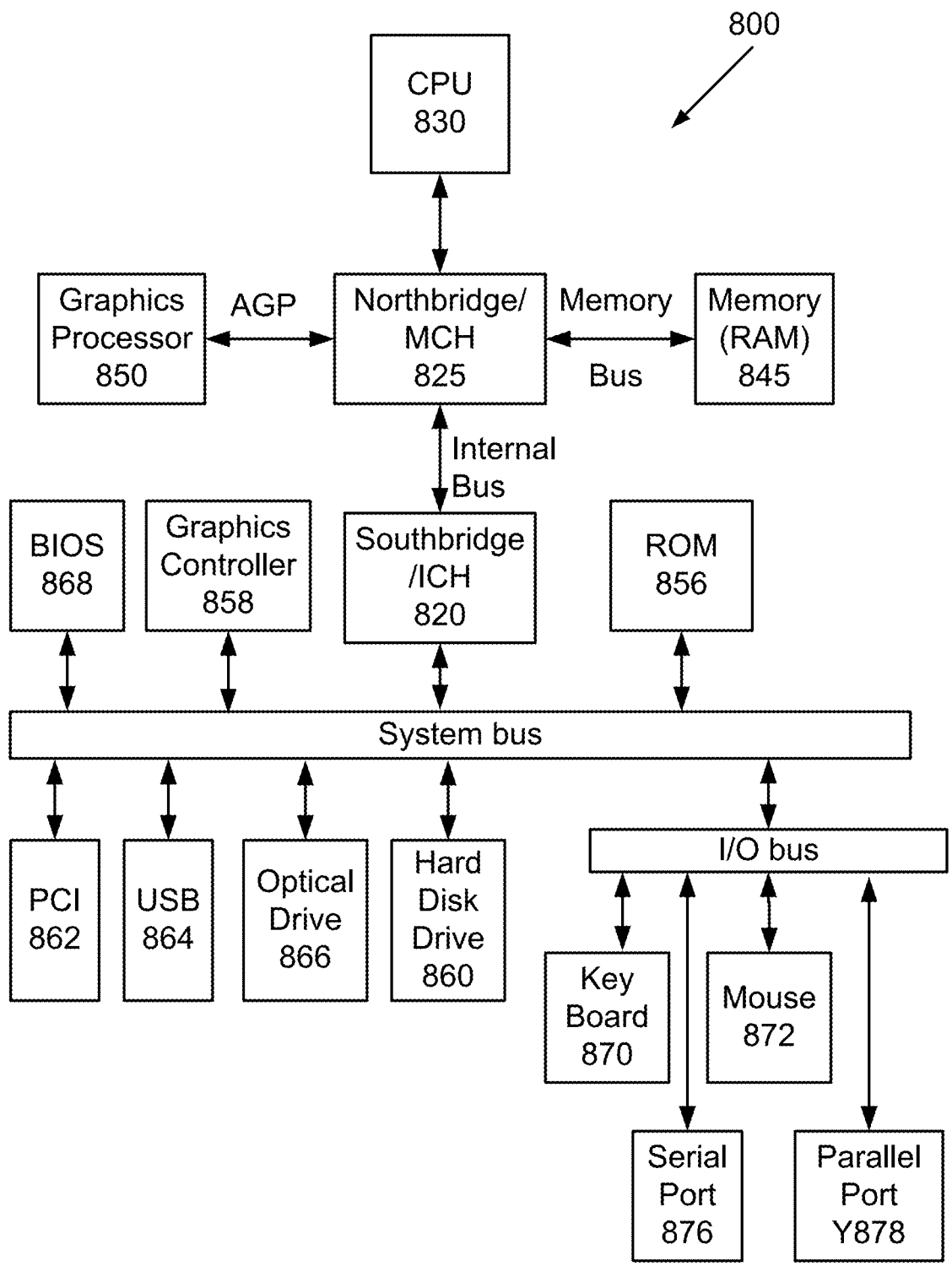
FIG. 8 is an exemplary schematic diagram of a data processing system used within the controller, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
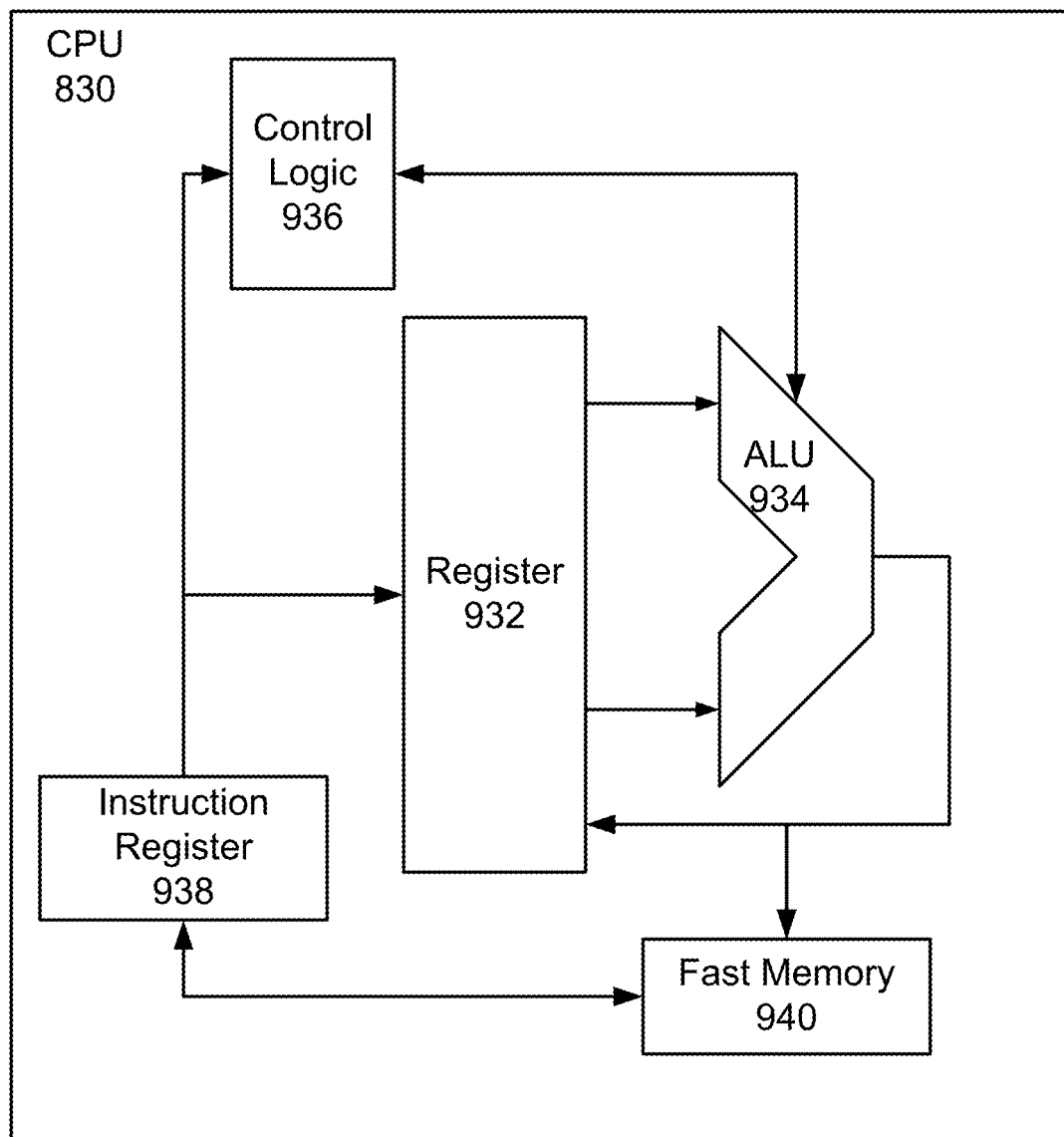
FIG. 9 is an exemplary schematic diagram of a CPU used in the controller, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
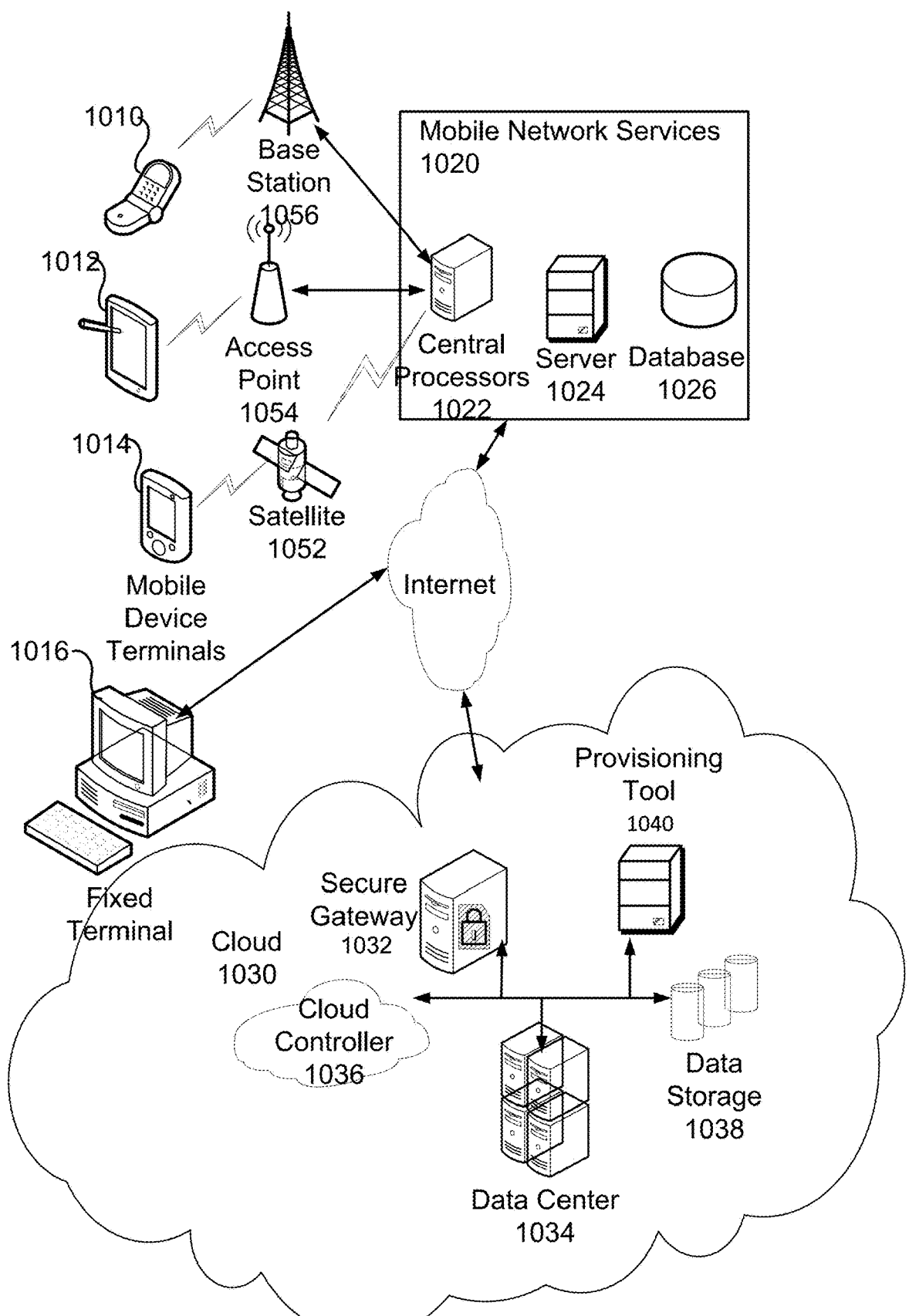
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding j structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for joint power allocation and cell formation for an energy efficient (EE) visible light communication (VLC) network, comprising:
grouping, by a control system, a plurality of user devices each connected to a photodiode photodetector into user centric clusters based on their distance to each other, wherein the visible light communication network includes a plurality of light-emitting diode (LED) access points (AP) having a half power light emission of from 10-30° and a plurality of photodiode photodetectors, wherein each photodiode photodetector is connected to a user device of one or more user centric clusters;
forming, by the control system, cells of the light-emitting diode access points, by associating an access point to each user centric cluster, wherein associating is based on maximizing cell capacity within each cell and minimizing inter-cell interference from other cells;
allocating power, by the control system, to the APs associated with each user centric cluster to maximize the energy efficiency (EE) of each user centric cluster;
calculating, by the control system an inter-cell interference, an energy efficiency of each user centric cluster and a global energy efficiency of the visible light communication (VLC) network; and
adjusting, by the control system, the operational status of each one of the plurality of APs based on the inter-cell interference and the global energy efficiency.

2. The method of claim 1, further comprising
grouping, by the control system, the user devices into K clusters, wherein K is a predefined number based on the number of APs in the system and wherein and the distances between the K clusters are $d_{i,j}$, i=1, ..., K, j=i+1, ..., K;
choosing, by the control system, a cluster center $c_k$ and the user devices for each cluster j so that the sum of the squares of the distances between each user device and the cluster center $c_k$ in the cluster K is less than a first predefined threshold U;
wherein the cluster centers $c_k$ are determined such that the product of the distances between all cluster centers is maximized such that the sum of the distances is less than or equal to a second predefined threshold D.

3. The method of claim 2, wherein associating an access point (AP) maximizes a cell capacity and minimizes an inter-cell interference in the other cells such that the global and cell cluster energy efficiencies are maximized.

4. The method of claim 2, further comprising
intensity modulating a light signal applied to a plurality of LEDs included in each access point to transmit information signals to a plurality of user devices in a cluster associated with the access point, wherein the photodiode photodetector of each user device receives the light signal.

5. The method of claim 3, further comprising
associating, by the control system, a first set of APs of the plurality of APs with a user device by finding a maximum channel value between a first AP of the first set and a first user device,
wherein the channel value $h_{i,j}$ is given by $$h_{i,j}^{(v)} = \frac{(m+1)A_P}{2\pi d_{i,j}^2} \cos^m(\phi) g_{of} f(\theta) \cos(\theta),$$

and $m = -1/\log_2(\cos(\theta_{1/2}))$, where $\theta_{1/2}$ is a half intensity radiation angle defined by the line-of-sight relationship of the access point and the photodiode photodetector, $A_p$ is a physical area of the photodiode photodetector, $d_{i,j}$ is the distance between the $i^{th}$ LED of the first AP to the $j^{th}$ user device, $g_{of}$ is the gain of the optical filter of the photodiode photodetector, $\phi$ is the angle of irradiance at the LEDs of the first AP, $\theta$ is an angle of incidence as seen at the photodiode photodetector, and $f(\theta)$ is an optical concentrator gain of the photodiode photodetector, which is a function of $\theta$ that is given by $$f(\theta) = \frac{n^2}{\sin^2(\Theta)} \text{ if } \theta \leq \Theta \text{ or } 0 \text{ if } \theta > \Theta,$$

where n is the refractive index and $\Theta$ is the semi-angle of the field-of-view (FOV) of the photodiode photodetector;
assigning, by the control system, the first AP to the first user device and repeating until all user devices are associated with an AP,
assigning, by the control system, the unassigned APs of the plurality of APs to the K clusters by finding the average channel value all APs to all user devices in a cluster c based on $$\hat{d}_{i,c} = \sum_{j \in c} h_{j,i}^2, c = 1, \ldots, K, i = 1, \ldots, N_A$$

and associating, by the control system, each AP i to the cluster that satisfies the relationship $I_i = \max(\hat{d}_{i,c}), c=1, \ldots, K$, where $I_i$ is the AP index.

6. The method of claim 4, further comprising
calculating, by the control system, the average per-cell energy efficiency, EE of each cluster based on $$EE = \frac{1}{K} \sum_{c=1}^{K} \eta_c, \text{ where } \eta_c = \frac{\beta \sum_{j=1}^{N_{u,c}} \log\left(1 + \frac{(p^2/2)P_{j,c}}{BN_0 + X_{c,j}}\right)}{\sum_{i=1}^{N_{A,c}} \sum_{j=1}^{N_{u,c}} g_{i,j}^2 P_{j,c}}$$

where $P_{j,c}$ is an assigned power for a user j in a cell c, $X_{c,j}$ is the interference received at the user j in the cell c, and $\beta$, $N_0$, $g_{ij}^2$ and B are predetermined operational parameters of an AP.

7. The method of claim 6, further comprising
calculating, by the control system, the global energy efficiency, GEE, of the network based on $$GEE = \frac{\beta \sum_{c=1}^{K} \sum_{j=1}^{N_{u,c}} \log\left(1 + \frac{(p^2/2)P_{j,c}}{BN_0 + X_{c,j}}\right)}{\sum_{c=1}^{K} \sum_{i=1}^{N_{A,c}} \sum_{j=1}^{N_{u,c}} g_{i,j}^2 P_{j,c}},$$

where $P_{j,c}$ is the assigned power for a user device j in a cell c, $X_{c,j}$ is the interference received at the user j in the cell c, and $\beta$ is a predefined intensity modulation value, and $N_0$, $g_{ij}^2$ and B are constants representing operational parameters of the AP stored in the database.

8. The method of claim 7, further comprising
determining, by the control system, the inter-cell interference by measuring the strength of a signal received at a user device and the interference at the user device and calculating the ratio, $\gamma_{i,c}$, of the square of the signal strength to the interference;
adjusting, by the control system, the status of the APs by sorting the APs by their $\gamma_{i,c}$ ratios;
calculating a first global energy efficiency;
for each AP, starting from the AP having the lowest $\gamma_{i,c}$ ratio,
determining whether the number of active APs is greater than the number of users in each cluster;
if the number of active APs is not greater than the number of users in each cluster, stop determining the inter-cell interference;
if the number of active APs is greater than the number of user devices in each cluster, changing the status of the AP having the lowest $\gamma_{i,c}$ ratio;
calculating a second global energy efficiency;
comparing the second global energy efficiency to the first global energy efficiency;
if the second global energy efficiency is not greater than the first global energy efficiency, stop determining the inter-cell interference;
if the second global energy efficiency is greater than the first global energy efficiency, changing the status of the AP having the third lowest $\gamma_{i,c}$ ratio, calculating a third global energy efficiency and comparing the third global energy efficiency to the second global energy efficiency;
ceasing the determination of the inter-cell interference if the third global energy efficiency is not greater than the second global energy efficiency,
continuing to change the status of each AP having the next lowest $\gamma_{i,c}$ ratio if the third global energy efficiency is greater than the second global energy efficiency, then
calculating the next global energy efficiency, and comparing to the previous global energy efficiency until the difference between the next global energy efficiency, and the previous global energy efficiency equals zero.

* * * * *